(12) United States Patent
Grätz

(10) Patent No.: US 12,082,984 B2
(45) Date of Patent: Sep. 10, 2024

(54) INTERDENTAL INSTRUMENT

(71) Applicant: Edenta Etablissement, Schaanwald (LI)

(72) Inventor: Oliver Grätz, Bregenz (AT)

(73) Assignee: Edenta Etablissement, Schaanwald (LI)

( * ) Notice: Subject to any disclaimer, the term of this patent is extended or adjusted under 35 U.S.C. 154(b) by 611 days.

(21) Appl. No.: 17/287,875

(22) PCT Filed: Sep. 6, 2019

(86) PCT No.: PCT/EP2019/073894
§ 371 (c)(1),
(2) Date: Apr. 22, 2021

(87) PCT Pub. No.: WO2020/083554
PCT Pub. Date: Apr. 30, 2020

(65) Prior Publication Data
US 2021/0369424 A1 Dec. 2, 2021

(30) Foreign Application Priority Data
Oct. 23, 2018 (DE) ...................... 10 2018 126 369.4

(51) Int. Cl.
*A61C 15/04* (2006.01)
*B29C 45/16* (2006.01)

(52) U.S. Cl.
CPC ............ *A61C 15/048* (2013.01); *B29C 45/16* (2013.01)

(58) Field of Classification Search
CPC ....... A61C 15/00; A61C 15/04; A61C 15/042; A61C 15/046; A61C 15/047;
(Continued)

(56) References Cited

U.S. PATENT DOCUMENTS 4,671,307 A * 6/1987 Curbow ............... A61C 15/046
132/323
4,706,694 A 11/1987 Lambert
(Continued)

FOREIGN PATENT DOCUMENTS

DE 9003517 U1 5/1990
WO 02049528 A2 6/2002

OTHER PUBLICATIONS

Notification of the Submission of the International Research Report and the Written Notice of International Research Authority dated Jan. 13, 2020, Application No. PCT/EP2019/073894.
(Continued)

*Primary Examiner* — Cris L. Rodriguez
*Assistant Examiner* — Karim Asqiriba
(74) *Attorney, Agent, or Firm* — Banner & Witcoff Ltd.

(57) ABSTRACT

An interdental instrument may include a handling section (handle) for manual gripping of the interdental instrument, a carrier held by the handling section, on which an interdental part (e.g. a flossette or an abrasive element) is arranged, a joint device for pivotally holding the carrier on the handling section, so that the carrier can be pivoted relative to the handling section about a pivot axis between at least two mutually angularly offset holding positions. The joint device may include two mutually opposite sliding guide surfaces which are formed on the carrier side and/or handling section side, where the pivot axis crosses the sliding guide surfaces and may be being perpendicular to the two sliding guide surfaces.

18 Claims, 14 Drawing Sheets

Figure 24:
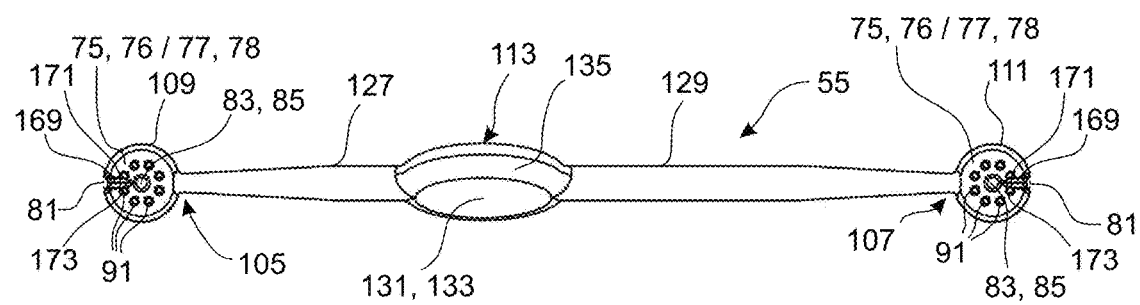

(58) Field of Classification Search
CPC .......... A61C 15/048; A61C 3/03; A61C 3/06;
A61C 3/12; A46B 5/0004; A46B 5/0008;
A46B 5/0012; A46B 5/0016; A46B
5/002; A46B 5/0045; A46B 5/0058; A46B
5/0087; A46B 5/0095; B26C 45/16
USPC ....................................................... 15/176.1
See application file for complete search history.

(56) References Cited

U.S. PATENT DOCUMENTS

| | | | |
|---|---|---|---|
| 5,125,424 A | 6/1992 | Eisen | |
| 5,581,838 A | 12/1996 | Rocco | |
| 5,974,618 A * | 11/1999 | Dumler | A61C 15/00 15/167.1 |
| 7,322,822 B2 * | 1/2008 | Navarro | A61C 3/06 433/125 |
| 8,893,733 B2 * | 11/2014 | Welt | A61C 15/048 132/323 |
| 2004/0202981 A1 * | 10/2004 | Luettgen | A61C 15/02 433/141 |
| 2005/0271999 A1 * | 12/2005 | Fishburne | A61C 3/06 433/141 |
| 2006/0057540 A1 * | 3/2006 | Navarro | A61C 3/06 433/166 |
| 2007/0044815 A1 | 3/2007 | Ashraf | |
| 2009/0165814 A1 * | 7/2009 | Welt | A61C 15/046 132/328 |
| 2010/0297575 A1 * | 11/2010 | Effenberger | A61C 19/063 132/329 |
| 2012/0021382 A1 * | 1/2012 | Dickie | A61C 17/222 132/309 |
| 2012/0148981 A1 * | 6/2012 | Rek | A61C 3/12 433/142 |
| 2014/0326274 A1 * | 11/2014 | Kollar | A61C 15/041 132/323 |
| 2016/0310246 A1 | 10/2016 | Borg | |
| 2017/0172705 A1 * | 6/2017 | Goldbecher | A61C 3/06 |
| 2022/0087797 A1 * | 3/2022 | Nazeri | A61C 15/046 |

OTHER PUBLICATIONS

German Action dated May 23, 2019, Application No. 10 2018 126 369.4.

* cited by examiner

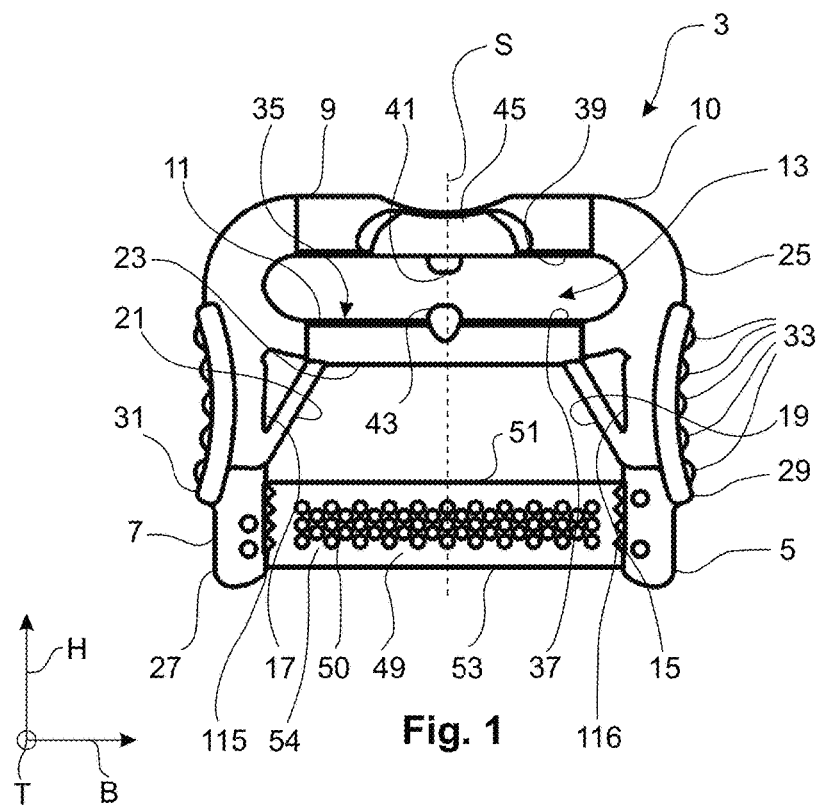

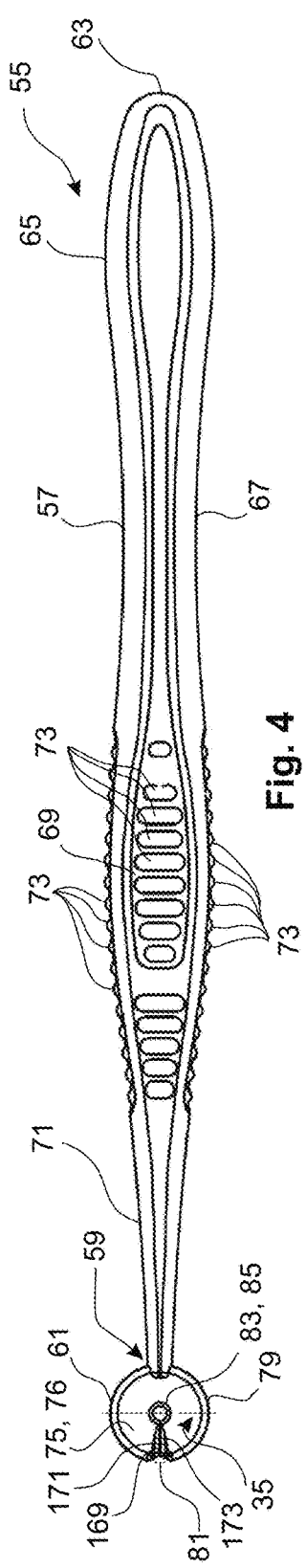
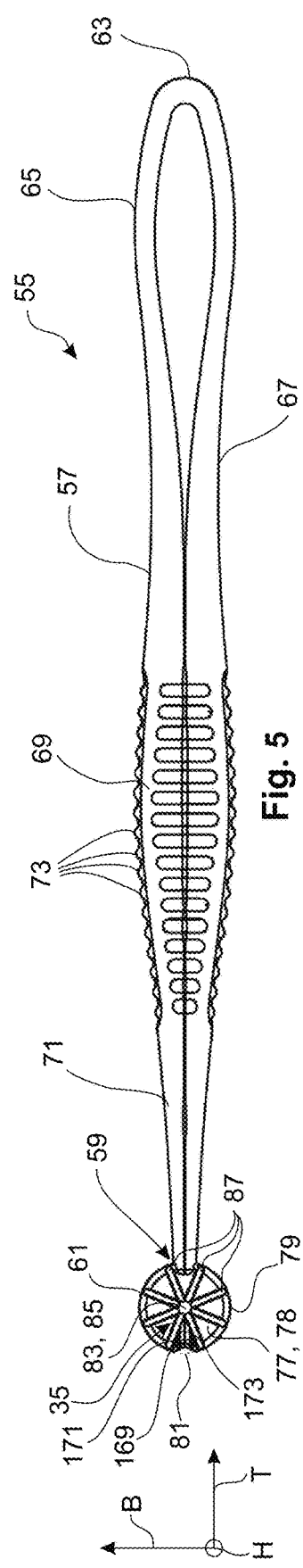
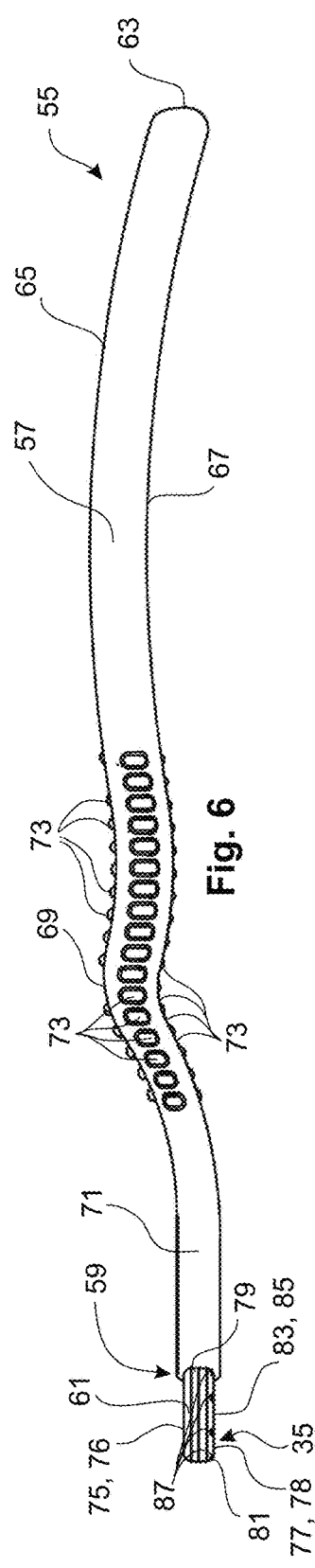

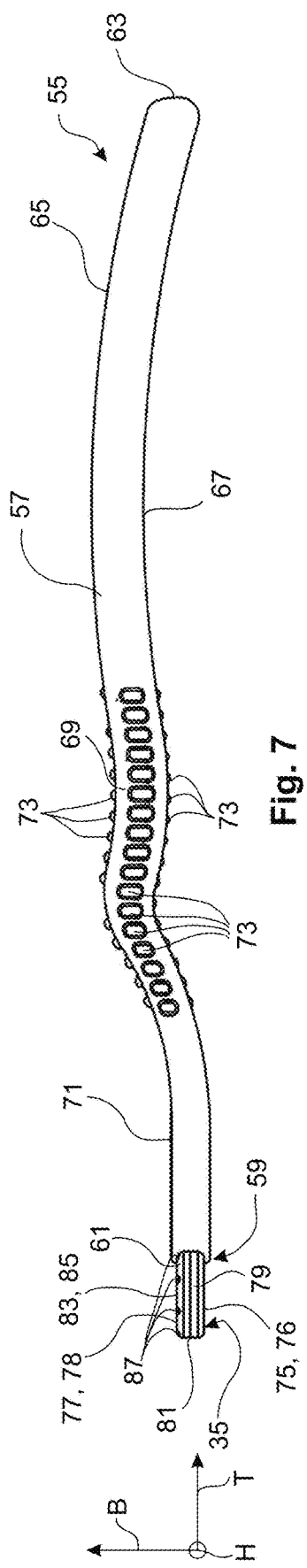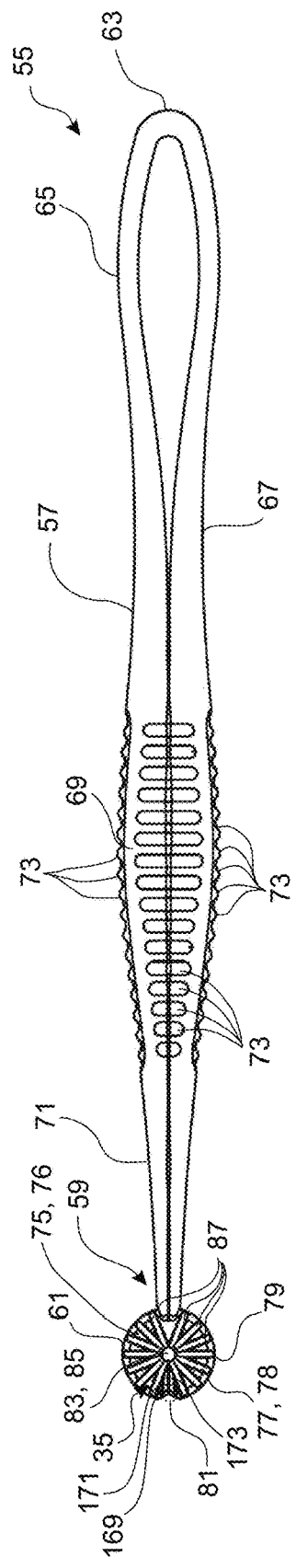

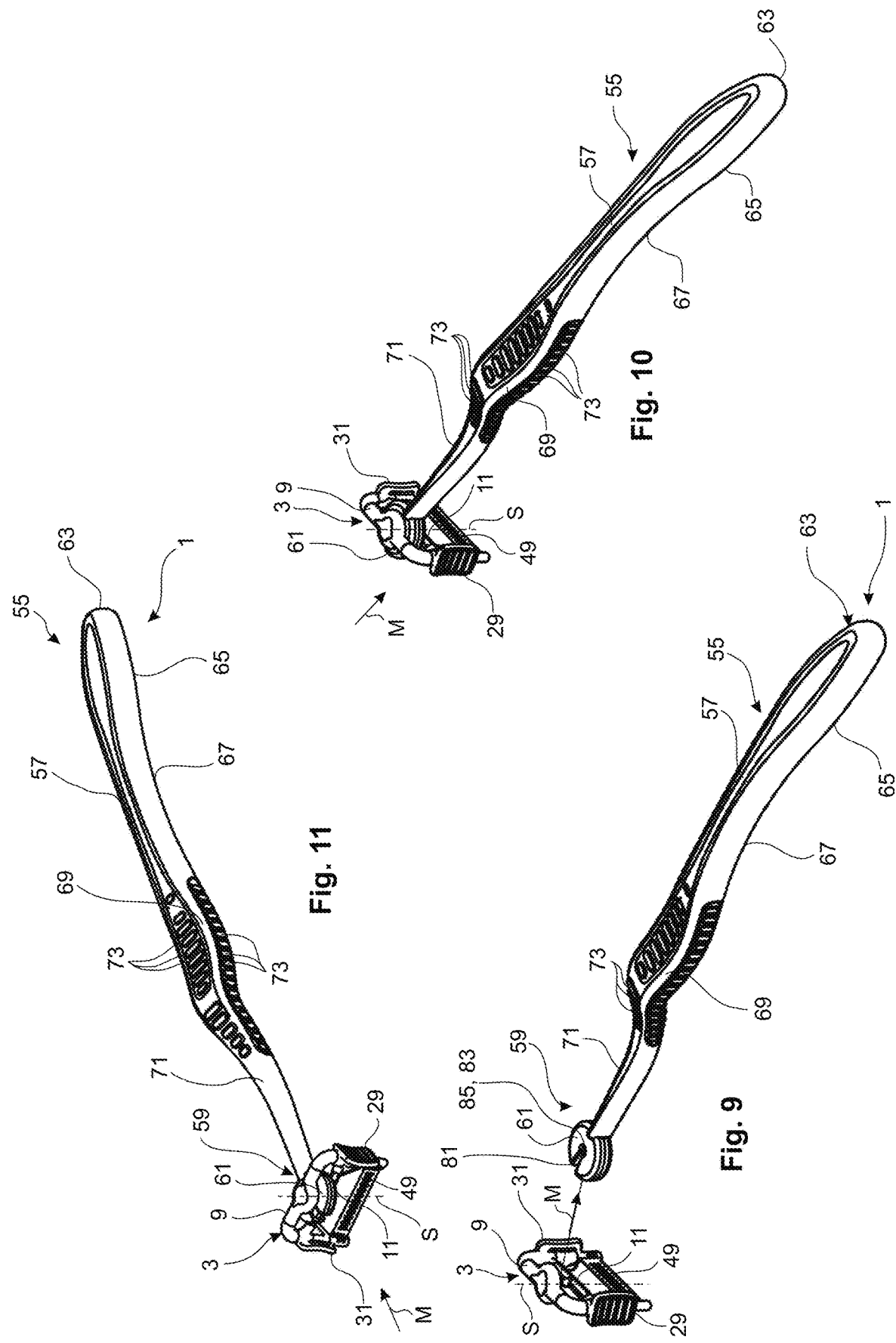

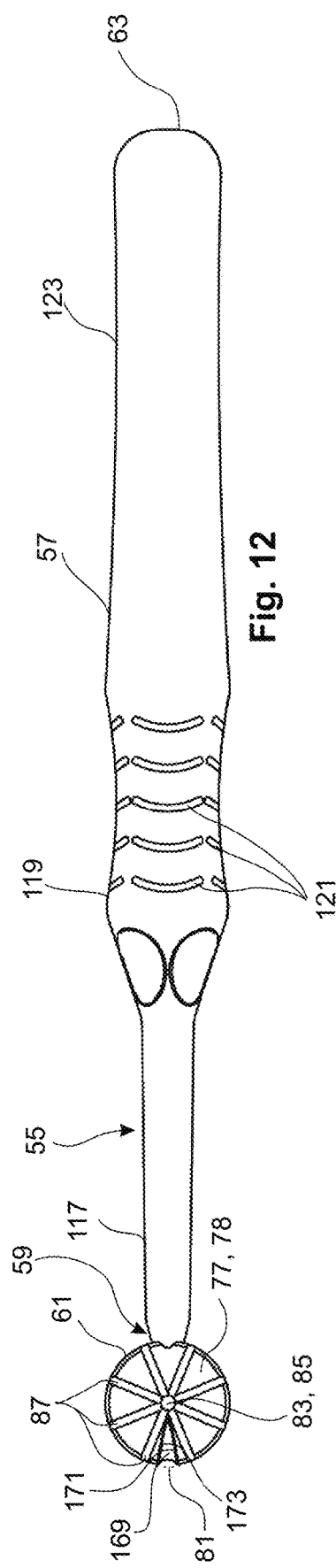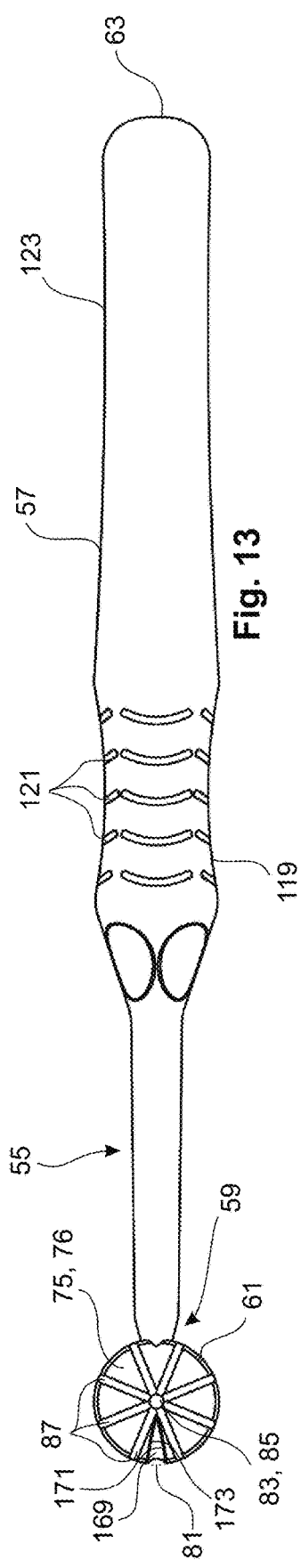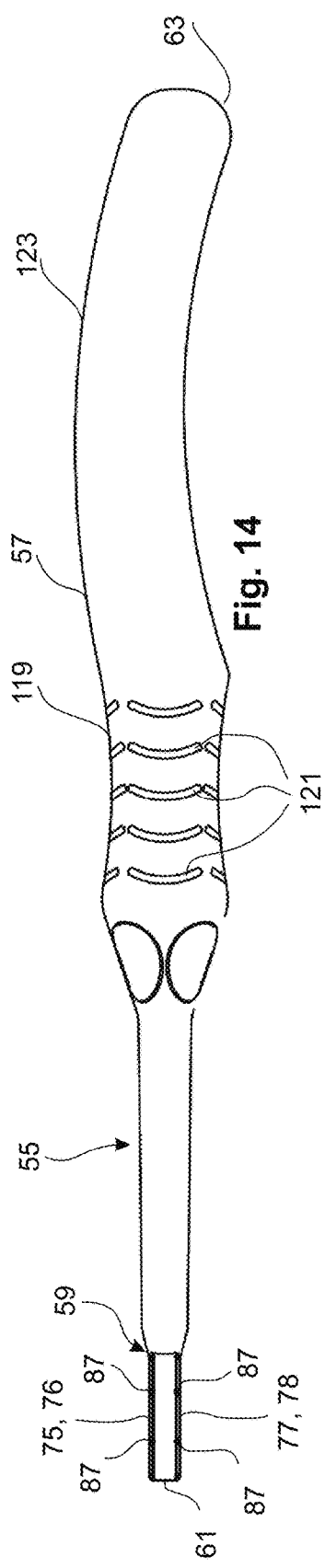

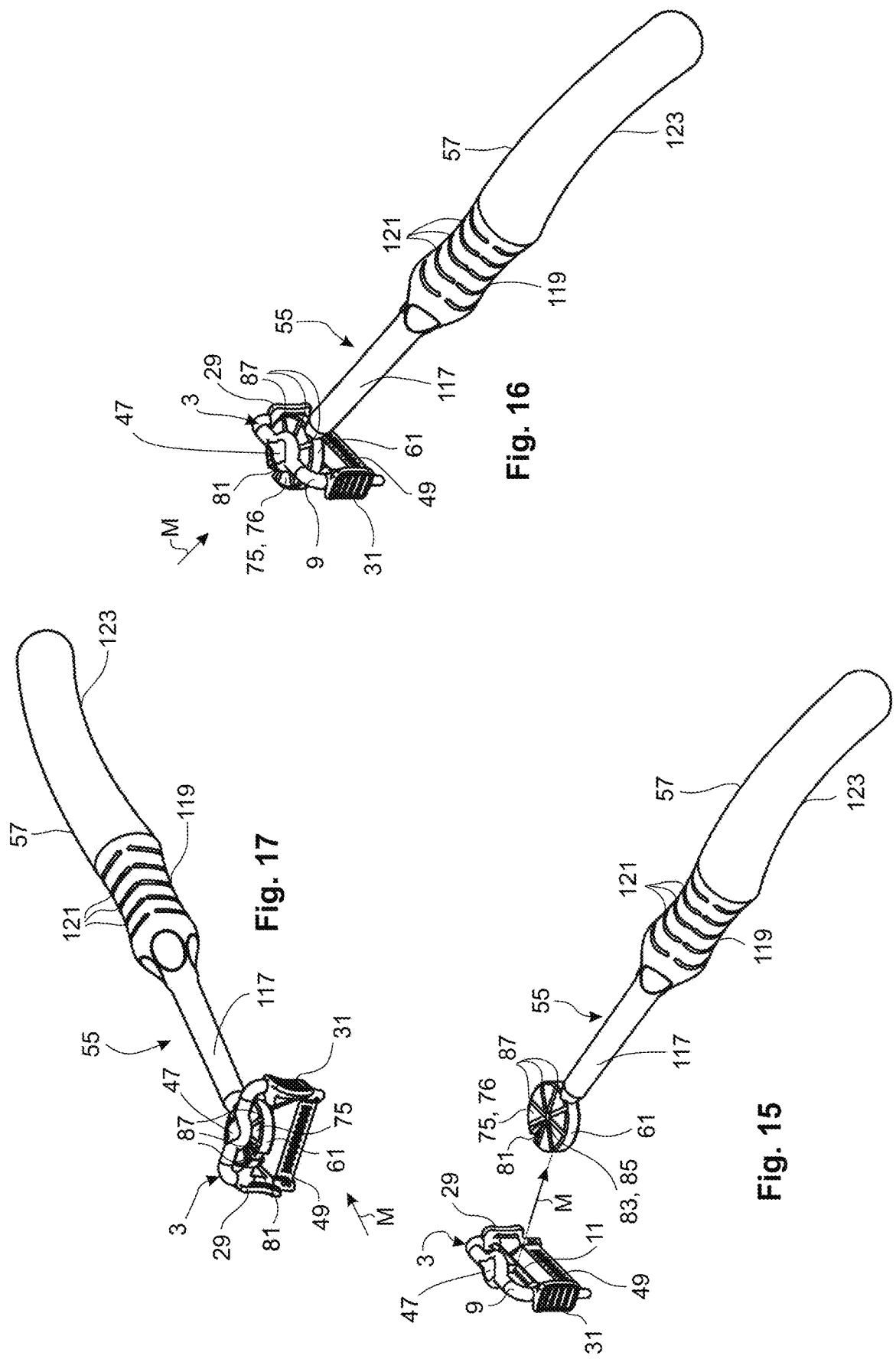

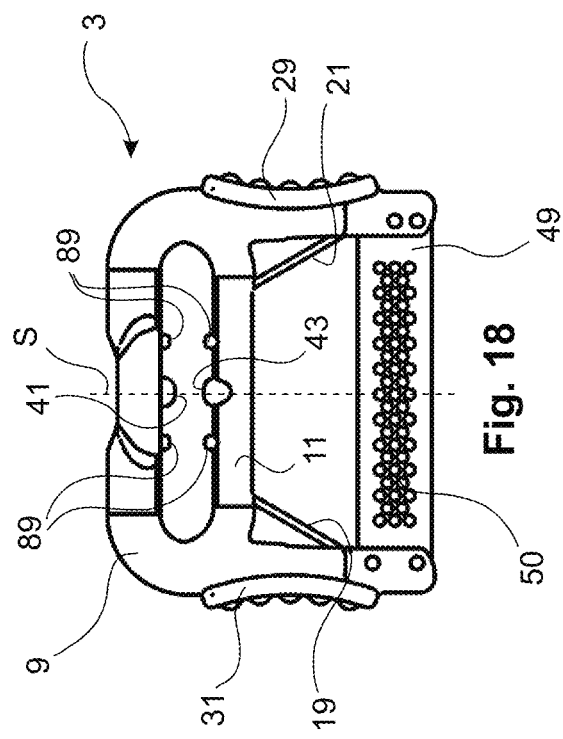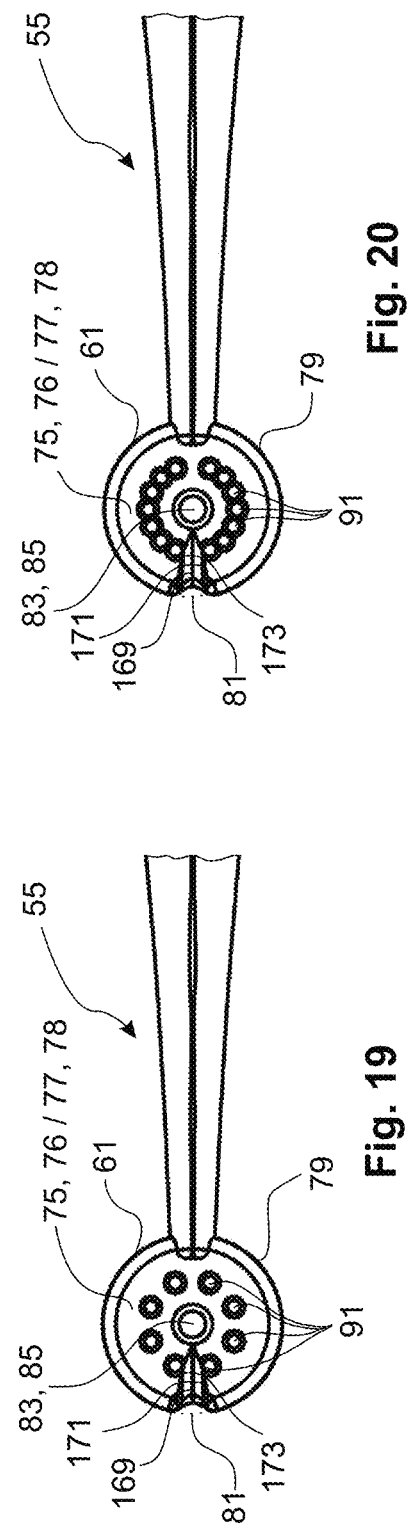

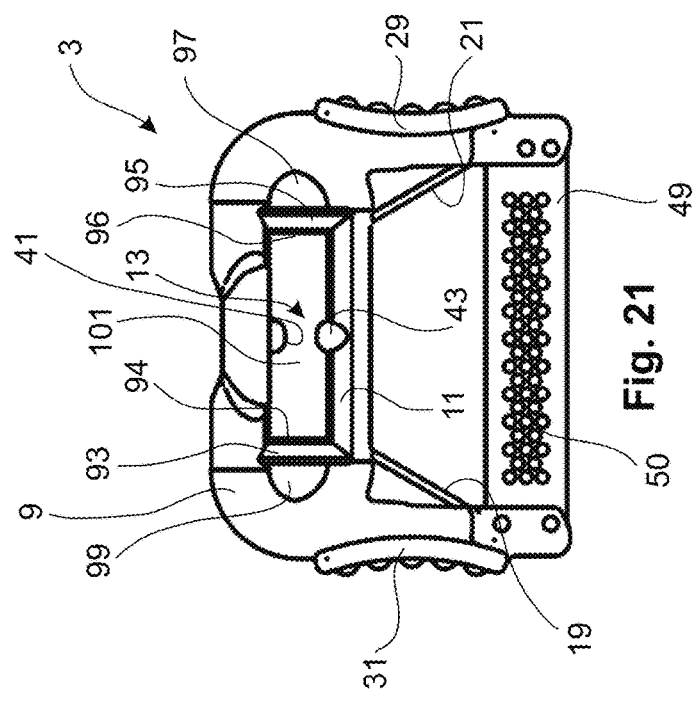
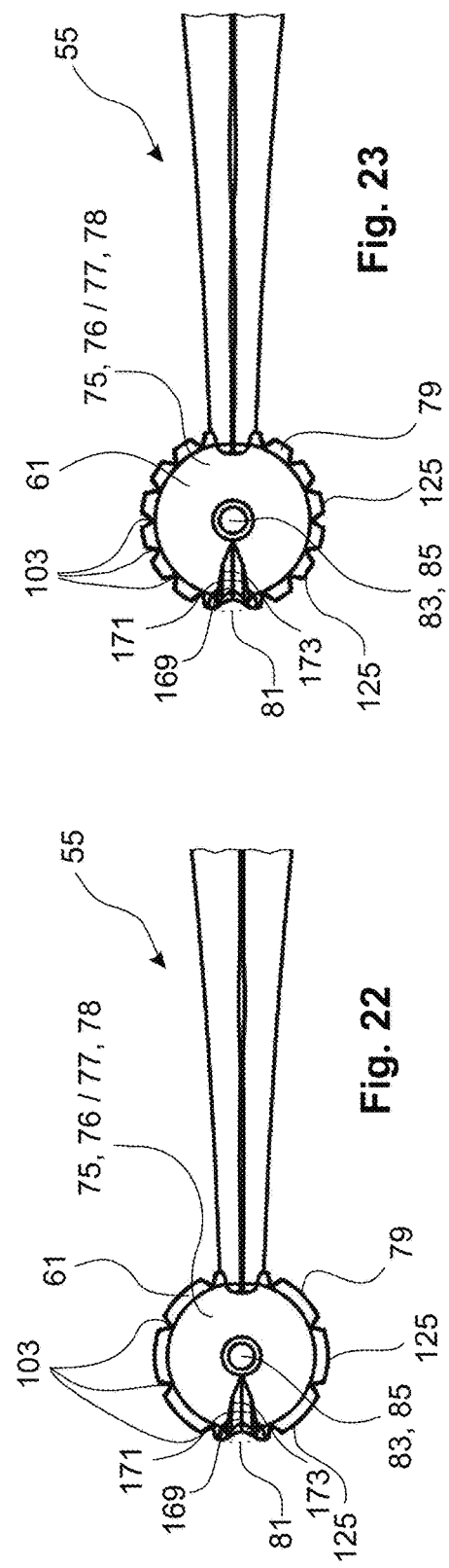

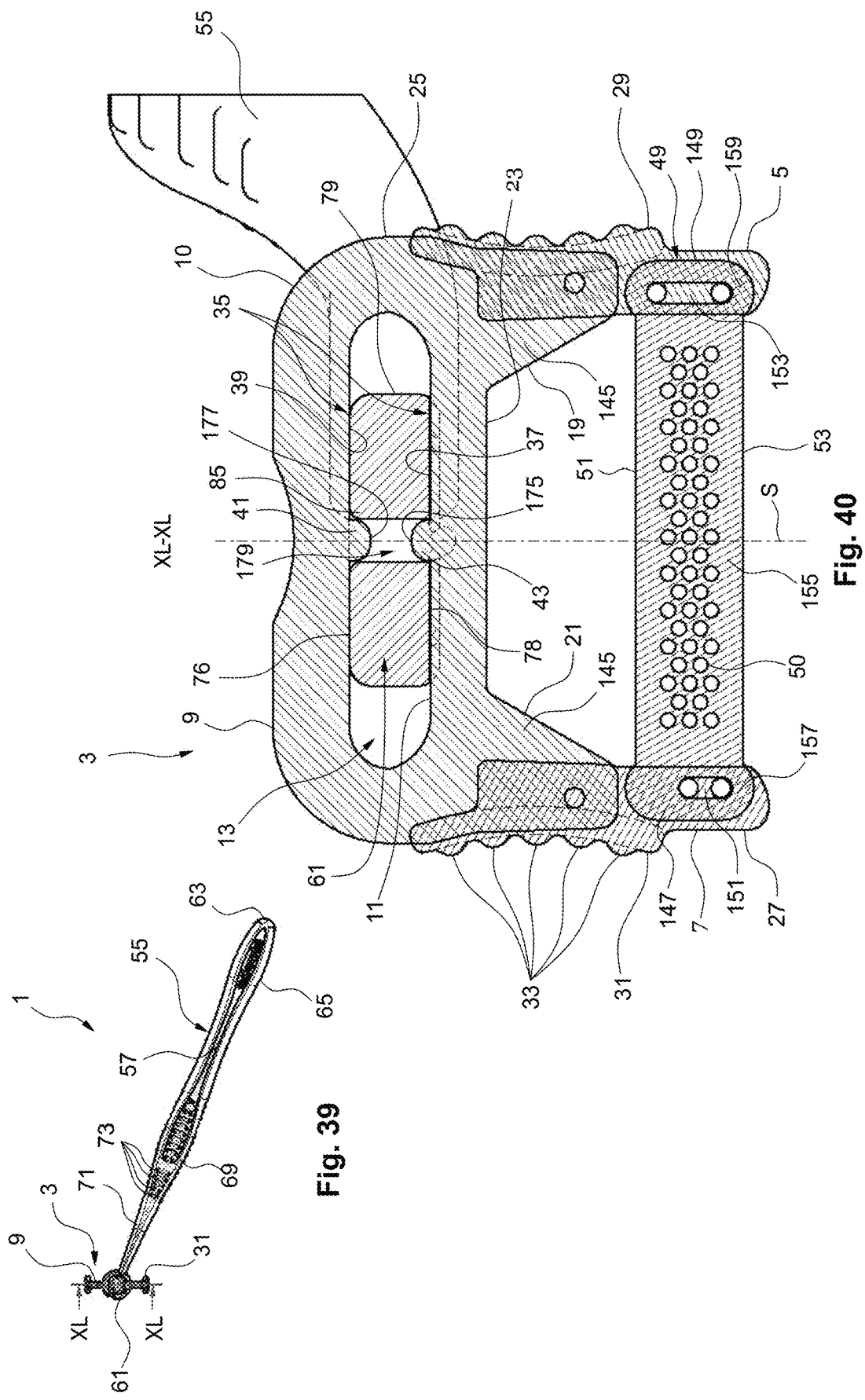

INTERDENTAL INSTRUMENT

CROSS REFERENCE TO RELATED APPLICATIONS

This patent application is a U.S. National Stage application of International Application No. PCT/EP2019/073894, filed on Sep. 6, 2019, which claims priority to German Patent Application No. 10 2018 126 369.4, filed Oct. 23, 2018. Each of these applications is incorporated herein by reference in its entirety.

BACKGROUND

Field

The present disclosure relates to an interdental instrument. The disclosure further relates to a handling section for an interdental instrument. Also, the present disclosure provides an abrasive element for an interdental instrument. Furthermore, the disclosure provides a carrier for an interdental instrument and a method of manufacturing a carrier for an interdental instrument.

Related Art

U.S. Pat. No. 8,893,733 discloses an application aid for dental floss for interdental treatment of patients. The application aid comprises an elongated actuating arm to which a holder for the dental floss can be detachably attached. The holder comprises two opposing clamping flanks for clamping the dental floss and a carrier connecting the two flanks. A fastening device is provided on the carrier for releasably connecting the holder to the actuating arm. The fastening device comprises a longitudinally slotted mushroom-shaped pin projecting from the carrier, which is pushed through a through-hole provided therein for fastening the holder to the actuating arm. Further, the fastening device comprises a locking member provided on the actuating arm for securing the pin to the actuating arm. In this regard, the holder is mounted to the actuating arm such that a central axis of the pivot corresponds to a pivot axis of the holder relative to the actuating arm. This means that the holder can be freely pivoted relative to the actuating arm to adapt to the respective requirements of the interdental spaces. The disadvantage of this is that due to the free positionability, the actual treatment of the interdental spaces is difficult, as the holder tends to pivot relative to the actuating arm during treatment.

For this reason, it is already known from U.S. Pat. No. 8,893,733 to attach an additional latching device to both the holder and the actuating arm. For this purpose, the actuating arm has a plurality of latching recesses on a side opposite the pin head, into which corresponding latching projections of the holder can latch in order to provide predetermined latching positions of the holder relative to the actuating arm. This design is relatively complex and requires, on the one hand, the components of the fastening device, at least the pin and the locking element, for fastening the holder to the actuating arm and, on the other hand, the components of the latching device for providing defined relative positions of the holder with respect to the actuating arm. A further disadvantage of the embodiment according to U.S. Pat. No. 8,893,733 is that the disassembly of the holder from the actuating arm is time-consuming and not easy to handling. This is because an operator must first grasp the mushroom head of the pin that protrudes slightly from the through-hole with an additional tool required, compress it, and push it back out of the actuating arm through the through-hole. Simple and easy assembly is important because generally interdental tools, such as a flossette or abrasive element, must be at least cleaned, i.e., sterilized, after single use on a patient, for which they usually must be disassembled. Alternatively, it may be necessary to replace them and not use them again. The actuator arm does not necessarily need to be replaced after each treatment and may have multiple uses, so different interdental tools must be easy and quick to mount and dismount on the actuator arm.

Furthermore, the floss holder of U.S. Pat. No. 8,893,733 is said to be designed to be flexible so that it can deform when used with the flexible floss. In addition, the flexibility serves to adjust tension on the clamped floss as needed. To secure the pin to the actuating arm, the locking element engages around the pin in a fork-like manner so that the mounting surfaces of the locking element and pin are oriented parallel to the pivot axis. The resulting small mounting surfaces, which also serve to transmit force between the locking element and the pin, only realize an unstable or wobbly attachment of the holder to the actuating arm. Such a mounting is unsuitable for abrasive elements, such as diamond strips and abrasive strips.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Figure 25:
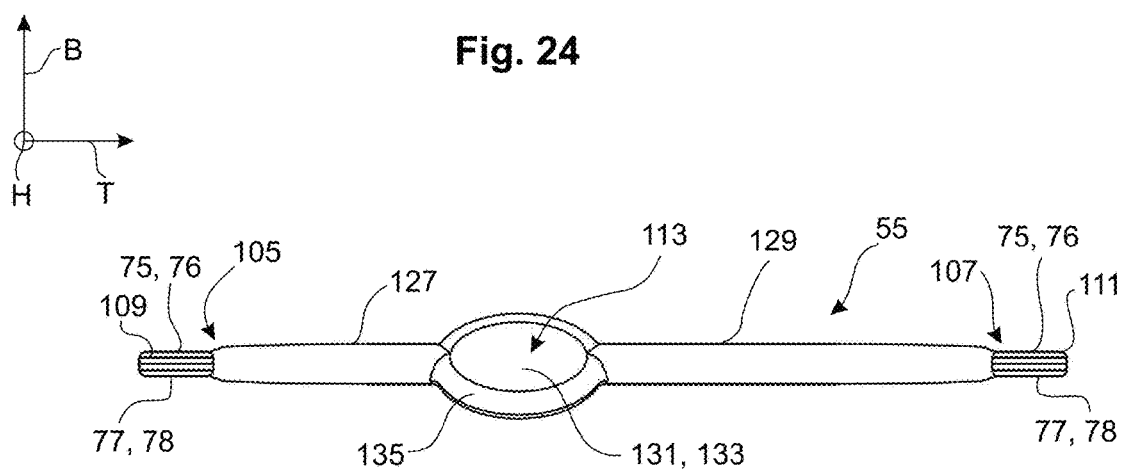
Figure 26:
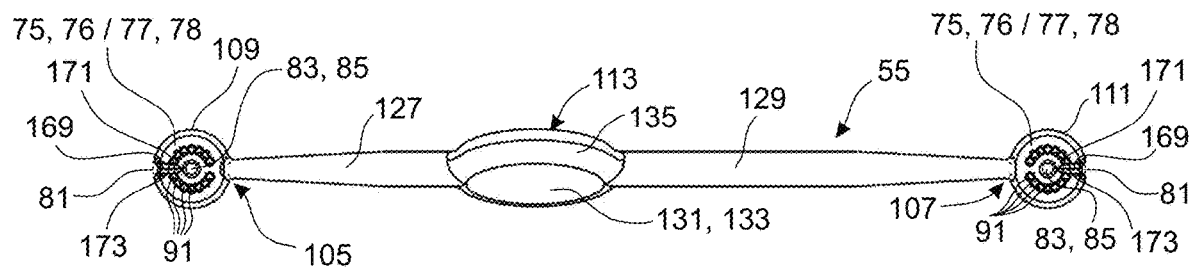
Figure 27:
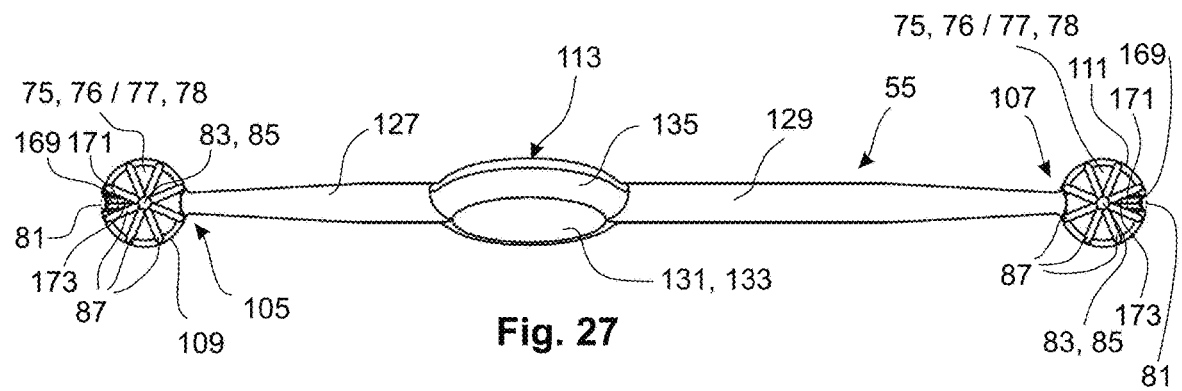
Figure 28:
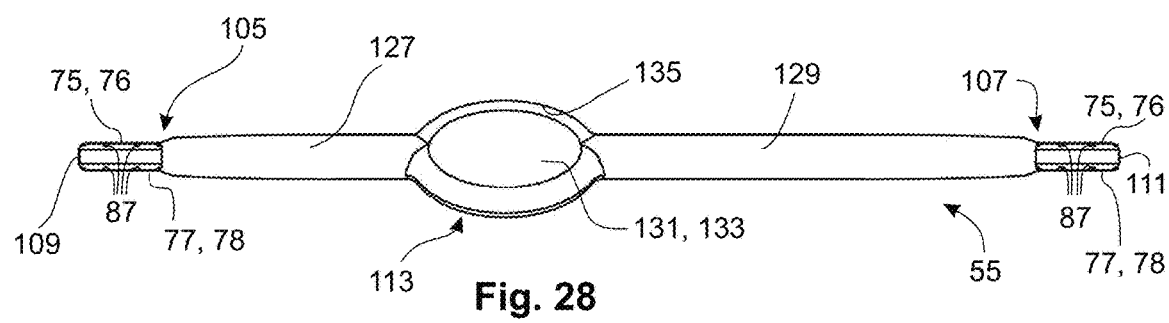
Figure 29:
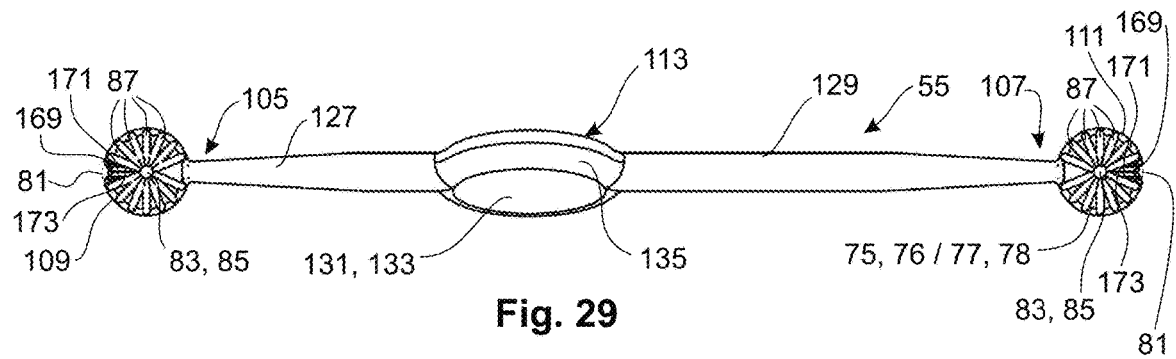
Figure 30:
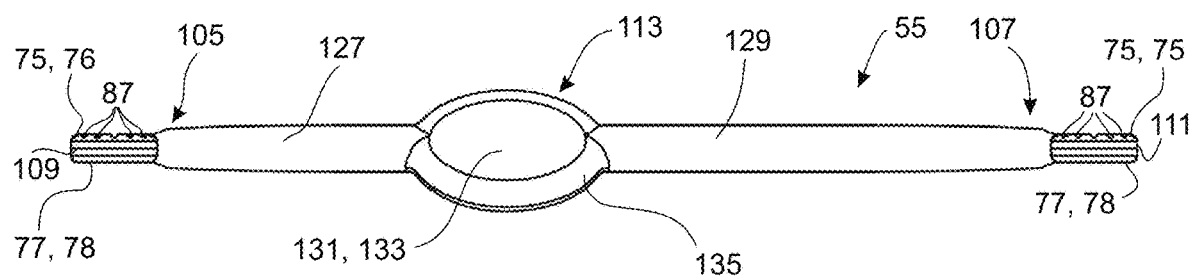
Figure 31:
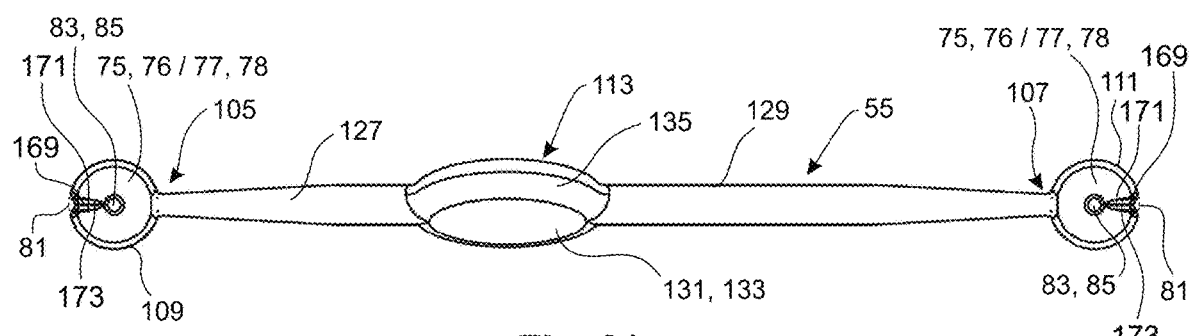
Figure 32:
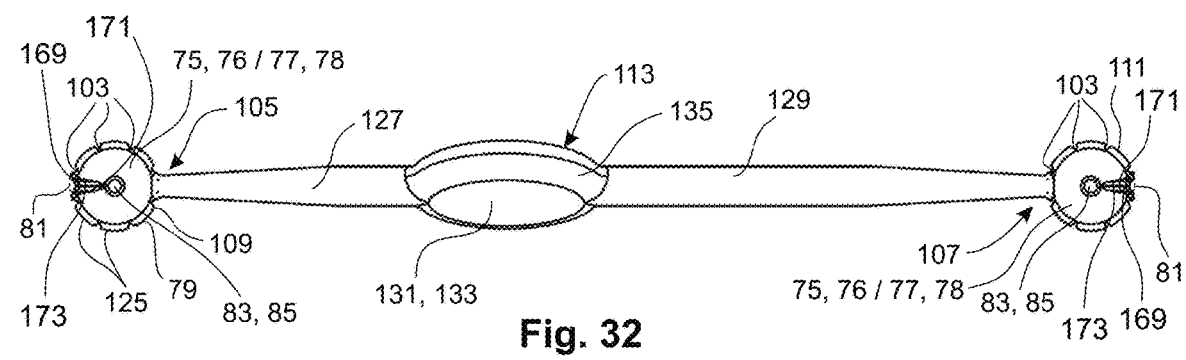
Figure 33:
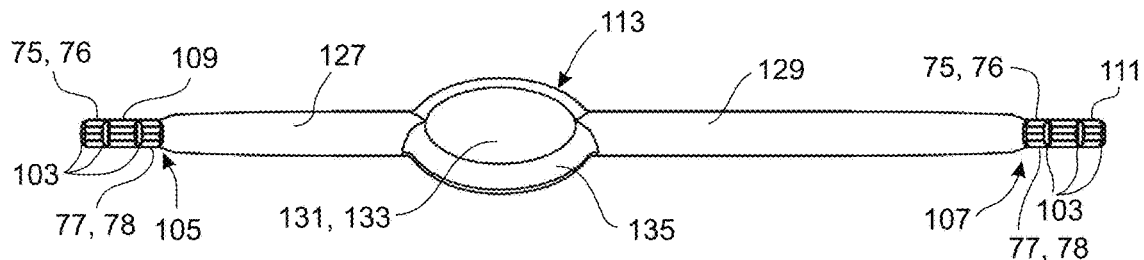
Figure 34:
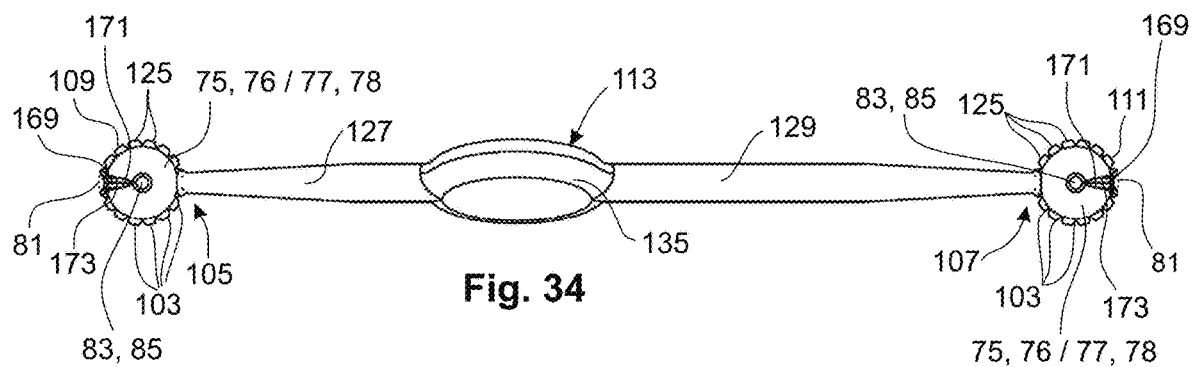
Figure 35:
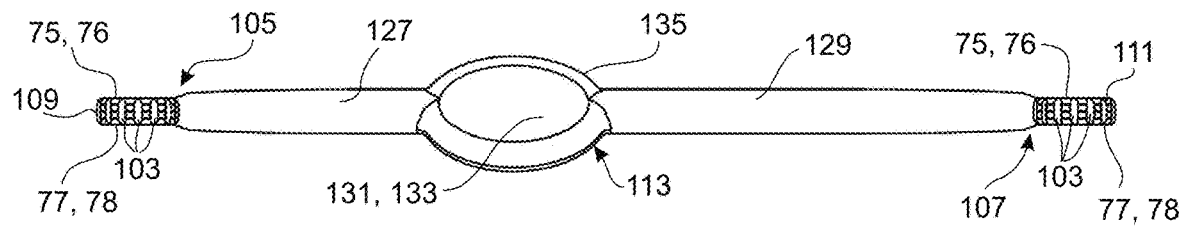
Figure 36:
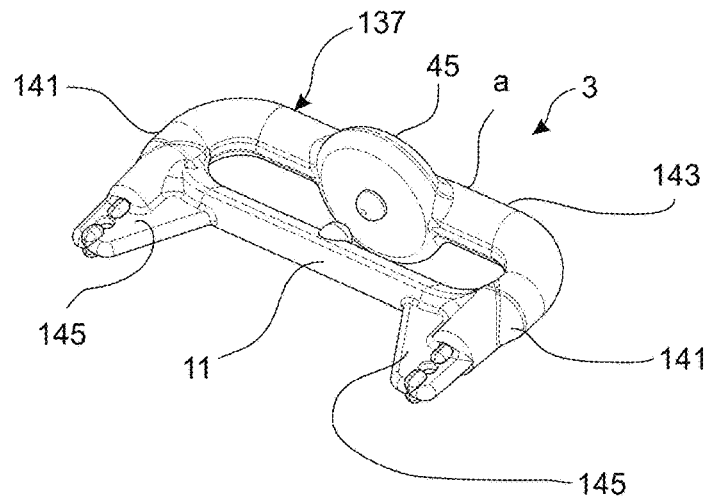
Figure 37:
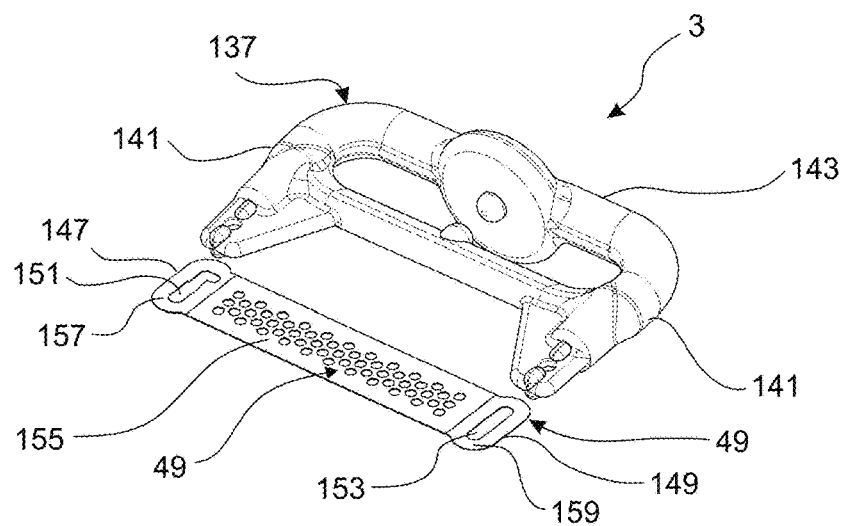
Figure 38:
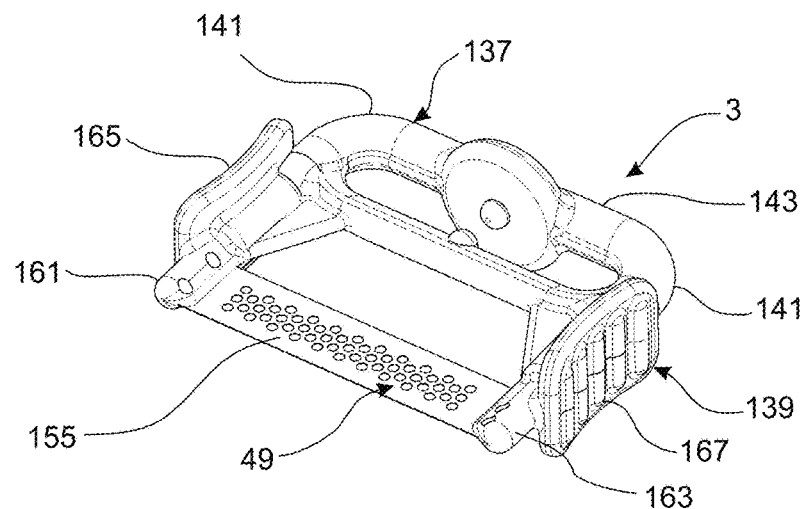

FIG. 1 a frontal view of a first embodiment of a carrier with an interdental part of an interdental instrument according to the disclosure arranged thereon;

FIG. 2 a perspective view of the carrier according to FIG. 1;

FIG. 3 a side view of the carrier according to FIGS. 1 and 2;

FIG. 4 a top view of a first embodiment of a handling section of the interdental instrument according to the disclosure;

FIG. 5 a bottom view of the handling section according to FIG. 4;

FIG. 6 a side view of the handling section according to FIGS. 4 and 5;

FIG. 7 a side view of an alternative handling section;

FIG. 8 a bottom view of a further alternative of the handling section;

FIG. 9 a pre-assembly state of a first embodiment of the interdental instrument according to the disclosure;

FIG. 10 an assembly state of the interdental instrument according to FIG. 9;

FIG. 11 an assembly state of the interdental instrument according to FIGS. 9 and 10;

FIG. 12 a top view of a second embodiment of the handling section of the interdental instrument according to the disclosure;

FIG. 13 a bottom view of the handling section according to FIG. 12;

FIG. 14 a side view of the handling section according to FIGS. 12 and 13;

FIG. 15 a pre-assembly state of a second embodiment of the interdental instrument according to the disclosure;

FIG. 16 an assembly state of the interdental instrument according to FIG. 15;

FIG. 17 another assembly state of the interdental instrument according to the disclosure as shown in FIGS. 15 and 16;

FIG. 18 a frontal view of a second embodiment of a carrier for an interdental instrument according to the disclosure;

FIG. 19 a top view of a section of a third embodiment of a handling section for an interdental instrument according to the disclosure;

FIG. 20 a top view of a section of a fourth embodiment of a handling section for an interdental instrument according to the disclosure;

FIG. 21 a frontal view of a third embodiment of a carrier for an interdental instrument according to the disclosure;

FIG. 22 a top view of a section of a fifth embodiment of a handling section for an interdental instrument according to the disclosure;

FIG. 23 a top view of a section of a sixth embodiment of a handling section for an interdental instrument according to the disclosure;

FIG. 24 a further embodiment of a handling section of an interdental instrument according to the disclosure with two carriers, each of which can be arranged at one end of the hand section;

FIG. 25 a side view of the embodiment of the handling section according to FIG. 24;

FIG. 26 another exemplary embodiment of a handling section according to the disclosure;

FIG. 27 another exemplary embodiment of an exemplary handling section;

FIG. 28 a side view of the handling section according to FIG. 27;

FIG. 29 an additional exemplary embodiment of a handling section according to the disclosure in top view;

FIG. 30 a side view of the handling section according to FIG. 29;

FIG. 31 a bottom view of the handling section shown in FIGS. 29 and 30;

FIG. 32 another exemplary embodiment of the handling section according to the disclosure;

FIG. 33 a side view of the handling section according to FIG. 32;

FIG. 34 another exemplary embodiment of a handling section according to the disclosure;

FIG. 35 a side view of the handling section according to FIG. 34;

FIG. 36 a perspective view of an assembly section of a carrier for an interdental instrument according to the disclosure;

FIG. 37 a perspective view of the mounting section according to FIG. 36 with the interdental part disassembled;

FIG. 38 an assembled carrier according to the disclosure;

FIG. 39 a top view of an exemplary embodiment of an interdental part according to the disclosure; and FIG. 40 a sectional view according to the XL-XL line in FIG. 39.

The exemplary embodiments of the present disclosure will be described with reference to the accompanying drawings. Elements, features and components that are identical, functionally identical and have the same effect are—insofar as is not stated otherwise—respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, and components have not been described in detail to avoid unnecessarily obscuring embodiments of the disclosure.

An object of the disclosure to overcome the disadvantages of the prior art, in particular to provide a more stable interdental instrument which is also suitable for use with abrasive elements and is easy and quick to mount and dismount. In addition, the disclosure is based on the task of improving a carrier for an interdental cleaning device to the effect that the carrier is more stable and suitable for use with abrasive elements and can be mounted and dismounted easily and quickly on a handling section of the interdental instrument.

Accordingly, an interdental instrument comprises a handling section for preferably manually gripping the interdental instrument. The interdental instrument can comprise a carrier for an interdental part, such as a flossette or an abrasive element, for example an abrasive or diamond strip, held by the handling section. The interdental part is preferably arranged or arrangeable on the carrier. By means of the handling section, the carrier with the interdental part can be operated, for example, to perform interdental cleaning or other processing from dentistry, such as contouring, finishing, pre- and high-gloss polishing of interdental surfaces, reducing tooth widths, grinding, cleaning, polishing and/or pre-treatment of teeth and fillings in the interdental space, on a patient. For example, the carrier may be made of a metal, preferably a stainless steel, titanium, or a metallic alloy. Further, plastics, composites, ceramic materials or ceramic composites may be used. For example, the handling section may be made of the same material as the carrier. For example, the handling section may be made of metal, such as stainless steel, titanium, or a metallic alloy, as well as plastic, composite, ceramic material, or ceramic composites. Preferably, materials for the carrier and handling section should be selected which comply with the hygiene regulations in the interdental field. Examples of standards are DIN EN ISO 13402, DIN EN ISO 21530, DIN EN ISO 7153 DIN EN ISO 10271. The materials of the components of an interdental instrument must be autoclavable at least 134° C. and must be able to be cleaned and disinfected by commercially available disinfectants. Materials can also be used which are not autoclavable but can be cleaned and disinfected by commercially available disinfectants. When selecting the material, it is preferable to take into account whether the respective component or the respective application is a so-called semi-critical application, in which the interdental treatment is held in such a way that no blood contact occurs with the respective component, or a so-called critical application, in which blood contact can occur on the corresponding component of the interdental instrument during the interdental treatment. Components of the interdental instrument which are designed for critical use must in particular be capable of being autoclaved at least 134° C. and cleaned or disinfected by commercially available disinfectants. In the case of semi-critical use, autoclavability at least 134° C. is not mandatory, so that cleaning or disinfection with commercially available disinfectants is sufficient. It is also possible for the handling section and the carrier to be made from a single piece, for example by means of an injection molding process or made from a solid material.

The interdental part can be an abrasive element, such as an abrasive strip or a diamond strip. The interdental part and/or the abrasive element is permanently or detachably arranged on the carrier. For example, the interdental part and/or the abrasive element is manufactured by means of an injection molding process. It is also conceivable that the abrasive element is manufactured, for example, with the carrier by means of a two-component injection molding process. Exemplary materials for the abrasive element are corrosion-resistant metal, for example stainless steel, or also plastics. The diamond coating of the diamond strips can have diamond grits in the range between 5 µm and 200 µm grit diameter. It is possible to provide the diamond coating on one side or both sides of the abrasive element. For example, the carrier and/or the abrasive element may have an indication device by means of which it is possible to read off or identify on which side or surface of the abrasive element the grit or diamond coating is provided. This ensures rapid identification of the corresponding required treatment side of the abrasive element and prevents misuse of the abrasive element. In the case of some abrasive elements, such an indication device is even necessary, since it is not possible to see with the naked eye on which side the grit or diamond coating is located on the abrasive element. For example, the indication device can be a color and/or structural indication device. A diamond-free zone may be formed in a central section of the abrasive element viewed in the longitudinal extension direction. Furthermore, the two opposite abrasive edges forming along the longitudinal extension of the abrasive element are generally formed without a diamond coating. Thus, it is possible to produce the abrasive or diamond strips from an already diamond-coated metal strip by cutting them off transversely to the longitudinal extension of the metal strip, using, for example, laser or mechanical cutting devices. Abrasive coatings on the abrasive elements can also be abrasives, such as aluminum oxide, silicon carbide or ceramic materials. Furthermore, it is conceivable to form the abrasive strip on the surface in such a way that the abrasive effect is achieved via the surface roughness. Furthermore, it is conceivable to design the abrasive or diamond strip diamond coating—or abrasive-free and to provide toothing, such as saw toothing, on at least one abrasive edge. A cycloidal or wavy shape of the abrasive edges can also be provided. Furthermore, it is conceivable to provide the abrasive or diamond strip on at least one abrasive edge with a toothing, such as a saw toothing. It is also possible that the abrasive element is made of stainless steel, in particular a stainless steel strip, and/or has openings, such as mechanical protrusions, on the surface, wherein in particular the abrasive element has the structure of a grater, rasp or shredder. For quick identification of the respective grits on the corresponding abrasive elements for a user, the abrasive elements can be marked with a color marking, such as color line(s), color dot(s) or other arbitrary shapes, and/or the carrier can have a colored surface that represents a color coding for identifying the different grits. For example, a total width of the abrasive element measured in the longitudinal extension direction is in the range of 5 mm to 35 mm, preferably in the range of 10 to 35 mm, preferably in the range of 15 to 35 mm, preferably in the range of 20 mm to 30 mm, in particular the width is about 25 mm. A total height of the abrasive element measured transversely to the direction of longitudinal extension may, for example, be in the range from 2 mm to 8 mm, preferably in the range from 3 mm to 7 mm or in the range from 4 mm to 6 mm.

A joint device can be provided on the interdental instrument for pivotally holding the carrier on the handling section. The carrier can be held pivotably on the handling section in such a way that the carrier can be pivoted about a pivot axis relative to the handling section. Preferably, at least two angularly offset holding positions of the carrier relative to the handling section are formed, between which the carrier can be pivoted relative to the handling section. The angular offset between the at least two holding positions is preferably determined by the pivot axis. In particular, the at least two angularly offset holding positions span an angular sector between them within which the carrier can be pivoted relative to the handling section about the pivot axis. The joint device may further comprise two sliding guide surfaces facing each other. The sliding guide surfaces may be formed on the carrier side and/or on the handling section side. The sliding guide surfaces may serve to guide the carrier during pivoting with respect to the handling section about the pivot axis to ensure safe, smooth and defined pivoting. The sliding guide surfaces can also be arranged on the carrier side and/or on the handling section side in such a way that the sliding guide surfaces on the carrier side and/or the guide surfaces on the handling section side rest on the respective opposite surfaces, in particular sliding guide surfaces, of the respective other component.

According to an exemplary embodiment of the disclosure, the holding positions are realized by holding position grooves or holding position projections. The holding position grooves can be formed by recesses in the sliding guide surfaces. The holding position projections can be formed, for example, by lugs projecting from the sliding guide surfaces, in particular parallel, preferably coaxial, to the pivot axis.

In a further exemplary embodiment, the joint device has at least two pairs of sliding guide surfaces arranged offset from one another and/or parallel to one another in the direction of the pivot axis. Each pair of surfaces is formed by a respective sliding guide surface of the handling section and a sliding guide surface of the carrier, in particular a so-called guide counter-surface of the carrier.

The carrier or the handling section can have a fork structure with two tines to form the pair of double surfaces, the inner or outer side of the tines respectively forming a guide counter-surface or sliding guide surface, depending on whether the handling section or the carrier has the fork structure. Due to the fork structure, a free space is formed between the two tines extending in particular parallel to one another, into which the carrier, in particular a disc-shaped section of the carrier, or the handling section, depending on whether the handling section or the carrier has the fork structure, can retract. When the carrier and the handling section are moved into one another, two mutually facing sliding guide surfaces, in particular a sliding guide surface of the handling section and a guide counter-surface of the carrier, can slide against one another along an assembly direction oriented essentially transversely, preferably perpendicularly, to the pivot axis.

In a preferred embodiment of the disclosure, the carrier forms the fork structure which accommodates a disc-shaped joint section of the handling section between the two tines arranged offset in the axial direction of the pivot axis, in particular braces them. In this way, a split pivot axis can be formed, in which two pivot points separated from each other in the axial direction are realized. These pivot points are formed in particular by projections or guide lugs, which will be described later, which are introduced in particular in the guide counter-surface and/or sliding guide surface or protrude therefrom.

According to a first aspect of the disclosure, the pivot axis crosses the sliding guide surfaces. Preferably, this results in a particularly stable interdental instrument in which, in particular, wobbling or jiggling of the carrier with respect to the handling section is avoided. Preferably, the pivot axis is perpendicular to the two sliding guide surfaces, in particular at an angle of 75° to 105°, 80° to 100° or 85° to 95°.

According to an exemplary embodiment of the interdental instrument according to the disclosure, the two sliding guide surfaces are formed planar. Alternatively or additionally, the two sliding guide surfaces can run parallel to one another, and preferably be formed plane-parallel. Additionally or alternatively, the two sliding guide surfaces can be clamped under an expansion clamping or a compression clamping with two opposing guide counter-surfaces of the carrier or the handling section. These geometric designs of the sliding guide surfaces and/or the additional clamping with guide counter-surfaces also improve the stability of the interdental instrument according to the disclosure.

In an exemplary embodiment of the disclosure, the two opposing sliding guide surfaces are arranged at one end of the handling section formed as a rod. Preferably, the handling section is formed as an elongated object whose extension in the longitudinal direction of the rod is significantly greater than its extension in the two further spatial directions, in particular further spatial directions oriented perpendicular to each other and with respect to the longitudinal direction of the rod. In particular, it may be provided that the two opposing sliding guide surfaces are arranged at both ends of the handling section formed as a rod. Alternatively or additionally, the two sliding guide surfaces can be formed on the handling section, wherein a guide counterpart of the carrier slides along the sliding guide surfaces when the carrier is pivoted with respect to the handling section about the pivot axis. In particular, the guide counterpart has two opposing guide surfaces. These guide counter-surfaces are in sliding engagement with the respective sliding guide surface to slide against each other during pivoting of the carrier relative to the handling section, preferably to allow guided and/or stable pivotability of the carrier relative to the handling section. The two sliding guide surfaces may also be formed on the carrier, which are in sliding engagement with two guide counter-surfaces, which are then formed on the handling section, when the carrier is pivoted relative to the handling section about the pivot axis. Preferably, the sliding guide surfaces and/or the guide counter-surfaces are each formed identically and/or each point in opposite directions, wherein in particular the surface normal vectors of the sliding guide surfaces are oriented parallel to one another and/or the surface normal vectors of the guide counter-surfaces are oriented parallel to one another.

In an exemplary embodiment of the interdental instrument according to the disclosure, the sliding guide surfaces and the guide counter-surfaces are not planar and/or not oriented parallel to each other. For example, the sliding guide surfaces and the guide counter-surfaces are shape-matched to each other. The sliding guide surfaces can have a concave structure or contour at least in some areas and the guide counter-surfaces can have a convex structure or contour at least in some areas, or vice versa.

According to a further development of the interdental instrument according to the disclosure, the two sliding guide surfaces and the two guide counter-surfaces, each of which is in sliding engagement and/or tensioned with one of the sliding guide surfaces, are crossed by the pivot axis. The pivot axis can, for example, be perpendicular or at an angle in the range of 75° to 105°, 80° to 100° or 85° to 95° on the two sliding guide surfaces and the two guide counter-surfaces.

In a further exemplary embodiment of the interdental instrument according to the disclosure, the two sliding guide surfaces and the two guide counter-surfaces are pretensioned against each other, preferably elastically pretensioned against each other. The pretensioning is preferably designed in such a way that a pivoting mobility of the carrier relative to the handling section about the pivoting axis is realized only in one pivoting plane. Preferably, the pivot plane is defined by the two sliding guide surfaces and the two guide counter-surfaces. The elastic pretension also increases the stability of the interdental instrument according to the disclosure and can ensure guided, stable pivoting of the carrier relative to the handling section.

In an exemplary embodiment of the disclosure, the handling section has a longitudinal extension direction which is aligned substantially parallel to the two sliding guide surfaces and, in particular, the longitudinal extension direction of the handling section is aligned parallel to the two guide counter-surfaces. Essentially parallel can be understood in such a way that an angle of less than 20° of the longitudinal extension direction can be formed with respect to the flat guide surfaces and/or guide counter-surfaces.

In an exemplary further development of the interdental instrument according to the disclosure, the joint device additionally has a respective latch for each holding position of the carrier on the handling section. Preferably, this ensures that the carrier is reliably held on the handling section during use of the interdental instrument. In particular, when the carrier is pivoted into a holding position, a latching resistance must be overcome, which in particular holds the carrier stationary with respect to the handling section in the holding position. For example, the latch may be formed by one or more latching lugs and one or more latching recesses, preferably of complementary shape. Furthermore, the latching lugs and the latching recesses can be coordinated with the pivoting movement, preferably oriented with respect to the pivot axis in such a way that the latching lugs can move out of the latching recesses and/or move into the latching recesses during pivoting. According to a further development of the disclosure, the at least one latching lug and/or the at least one latching recess is formed in the respective sliding guide surface and optionally in the guide counter-surface. This preferably results in a particularly simple and at the same time stable design of the interdental instrument according to the disclosure. Furthermore, pivoting and latching of the carrier with respect to the handling section or on the handling section is facilitated.

According to an exemplary embodiment of the interdental instrument according to the disclosure, one particularly free end of the handling section, preferably both particularly free ends of the handling section, have a disc shape. For example, a disc diameter is between 1 mm and 20 mm, in particular between 5 mm and 15 mm, preferably between 7.5 mm and 12.5 mm. A disc height, such as a disc material thickness may be in the range of 2 mm to 10 mm, preferably in the range of 3 mm to 8 mm, more preferably in the range of 4 mm to 6 mm. The opposing planar surfaces of the disc may form the two sliding guide surfaces, and in particular the complete opposing planar disc surfaces may form the sliding guide surfaces. For example, a circumferential edge of the disc-shaped end may be circular in shape and/or provided with latching lugs and/or provided with latching recesses. For example, the latching lugs and/or latching recesses can be associated with the at least two mutually angularly offset holding positions of the carrier with respect to the handling section.

In an exemplary further development of the interdental instrument according to the disclosure, the carrier has two clamping arms extending in particular parallel to one another. Preferably, the clamping arms are connected to each other in such a way that a clamping space is formed between the clamping arms. The clamping space can be shaped, preferably dimensioned, in such a way that the disc-shaped end of the handling section can be inserted into the clamping space. Preferably, the disc-shaped end of the handling section is insertable into the clamping space under elastic deformation of the carrier, in particular of the clamping arms. In particular, side regions of the clamping arms facing the sliding guide surfaces of the disc-shaped end are provided with latching elements which cooperate with latching counter-elements on the guide counter-surfaces.

According to a further aspect of the disclosure, which is combinable with the previous ones, an interdental instrument according to the disclosure comprises a handling section for preferably manually gripping the interdental instrument by an operator. Furthermore, the interdental instrument comprises a carrier held by the handling section, on which an interdental part, such as a flossette or an abrasive element, preferably for treating the interdental spaces on a patient, for example an abrasive strip or a diamond strip, is arranged. A joint means may be provided for pivotally holding the carrier to the handling section. Preferably, the joint means is provided such that the carrier is pivotable relative to the handling section about a pivot axis between at least two mutually angularly offset holding positions. For example, the carrier may be made of a metal, preferably a stainless steel, titanium, or a metallic alloy. Further, plastics, composites, ceramic materials or ceramic composites may find application. For example, the handling section may be made of the same material as the carrier. For example, the handling section may be made of metal, such as stainless steel, titanium, or a metallic alloy, as well as plastic, composite, ceramic material, or ceramic composites. Preferably, materials for the carrier and handling section should be selected which comply with the hygiene regulations in the interdental field. Examples of standards are DIN EN ISO 13402, DIN EN ISO 21530, DIN EN ISO 7153, DIN EN ISO 10271. The materials of the components of an interdental instrument must be autoclavable at least 134° C. and must be able to be cleaned and disinfected by commercially available disinfectants. Materials can also be used which are not autoclavable but can be cleaned and disinfected by commercially available disinfectants. When selecting the material, it is preferable to take into account whether the respective component or the respective application is a so-called semi-critical application, in which the interdental treatment is held in such a way that no blood contact occurs with the respective component, or a so-called critical application, in which blood contact can occur on the corresponding component of the interdental instrument during the interdental treatment. Components of the interdental instrument which are designed for critical use must in particular be capable of being autoclaved at least 134° C. and cleaned or disinfected by commercially available disinfectants. In the case of semi-critical use, autoclavability at least 134° C. is not absolutely necessary, so that cleaning or disinfection with commercially available disinfectants is sufficient.

The interdental part can be an abrasive element, such as an abrasive strip or a diamond strip. The interdental part or the abrasive element is permanently or detachably arranged on the carrier. It is also conceivable that the abrasive element is manufactured, for example, with the carrier in a two-component injection molding process. Exemplary materials for the abrasive element are corrosion-resistant metal, for example stainless steel, or also plastics. The diamond coating of the diamond strips can have diamond grits in the range between 5 μm and 200 μm grit diameter. It is possible to provide the diamond coating on one side or both sides of the abrasive element. For example, the carrier and/or the abrasive element may have an indicator and/or a color marking by means of which it is possible to read off or identify on which side or surface of the abrasive element the grit or diamond coating is provided. This ensures rapid identification of the corresponding required treatment side of the abrasive element and prevents misuse of the abrasive element. In the case of some abrasive elements, such an indication device is even necessary, since it is not possible to see with the naked eye on which side the grit or diamond coating is located on the abrasive element. For example, the indication device can be a color and/or structural indication device. A diamond coating-free zone may be formed in a central section of the abrasive element viewed in the longitudinal extension direction. Furthermore, the two opposite abrasive edges forming along the longitudinal extension of the abrasive element are generally formed without a diamond coating. Thus, it is possible to produce the abrasive or diamond strips from an already diamond-coated metal strip by cutting them off transversely to the longitudinal extension of the metal strip, using, for example, laser or mechanical cutting devices. Abrasive coatings on the abrasive elements can also be abrasives, such as aluminum oxide, silicon carbide or ceramic materials. Furthermore, it is conceivable to form the abrasive strip on the surface in such a way that the abrasive effect is achieved via the surface roughness. Furthermore, it is conceivable to design the abrasive or diamond strip diamond coating—or abrasive-free and to provide toothing, such as saw toothing, on at least one abrasive edge. A cycloidal or wavy shape of the abrasive edges can also be provided. Furthermore, it is conceivable to provide the abrasive or diamond strip on at least one abrasive edge with a toothing, such as a saw toothing. It is also possible that the abrasive element is made of stainless steel, in particular a stainless steel strip, and/or has openings, such as mechanical protrusions, on the surface, wherein in particular the abrasive element has the structure of a grater, rasp or shredder. For quick identification of the respective grits on the corresponding abrasive elements for a user, the abrasive elements can be marked with a color marking, such as color line(s), color dot(s) or other arbitrary shapes, and/or the carrier can have a colored surface that represents a color coding for identifying the different grits. For example, a total width of the abrasive element measured in the longitudinal extension direction is in the range of 15 mm to 35 mm, preferably in the range of 20 mm to 30 mm, in particular the width is about 25 mm. A total height of the abrasive element measured transversely to the direction of longitudinal extension may, for example, be in the range from 2 mm to 8 mm, preferably in the range from 3 mm to 7 mm or in the range from 4 mm to 6 mm.

A joint device can be provided on the interdental instrument for pivotally holding the carrier on the handling section. The carrier can be held pivotably on the handling section in such a way that the carrier can be pivoted about a pivot axis relative to the handling section. Preferably, at least two angularly offset holding positions of the carrier relative to the handling section are formed, between which the carrier can be pivoted relative to the handling section. The angular offset between the at least two holding positions is preferably determined by the pivot axis. In particular, the at least two angularly offset holding positions span an angular sector between them within which the carrier can be pivoted about the pivot axis relative to the handling section.

According to the second aspect of the disclosure, the joint device comprises a mounting/dismounting mechanism that allows mounting of the carrier at a single predetermined insertion position along a linear mounting direction. Preferably, the single predetermined insertion position is formed on the carrier and/or on the handling section. For example, the predetermined insertion position may be provided on both sides of the carrier and/or on the handling section.

Preferably, the mounting direction is an exclusively linear movement during mounting of the carrier to the handling section. When the slide-in mounting position is reached, i.e. preferably when the carrier is slid onto the handling section or inserted into the handling section in such a way that the carrier assumes a final mounting position beyond which the carrier cannot be displaced relative to the handling section, only a degree of freedom of pivoting movement about the pivot axis and disassembly of the carrier in the opposite direction to the linear mounting direction is permitted. On the one hand, the predefined mounting and dismounting direction, which is only possible in one direction, ensures simple and easy mounting or dismounting of the interdental instrument. On the other hand, the predefined assembly and disassembly direction as well as the fact that in the insertion assembly position only one degree of freedom of pivoting movement about the pivot axis and disassembly in the opposite direction to the assembly direction, i.e. in the disassembly direction, is permitted ensures that a particularly stable interdental instrument is provided. In addition, it is avoided that during the use of the interdental instrument the carrier is undesirably pushed down from the handling section.

Allow/allowed means that the corresponding components are formed in such a way that the respective movement possibility exists, while movements in other directions are prevented or blocked. In particular, the mounting/dismounting mechanism is formed in such a way that the carrier can be mounted at the predetermined insertion position only along the linear mounting direction and that movement of the carrier at the predetermined insertion position in a direction other than the linear mounting direction is prevented. In a preferred embodiment, the carrier in the slide-in mounting position can be rotated exclusively about the pivot axis and disassembled exclusively in the opposite direction to the linear mounting direction, while other movements of the carrier relative to the handling section are prevented or blocked.

In an exemplary embodiment of the interdental instrument according to the disclosure, the linear mounting direction of the carrier with respect to the handling section is realized by a material recess tapering towards the mounting position. The material recess can, for example, have a V-shape and/or be formed on the handling section. Preferably, the material recess is realized at a preferably disc-shaped end of the handling section. According to a further embodiment of the disclosure, a mounting lug engages the material recess during insertion into the insertion mounting position, such as a holding mounting position. Preferably, the mounting lug is arranged on the carrier, although it may also be arranged on the handling section. It is understood that depending on the positioning of the mounting lug, the material recess is to be arranged. For example, the material recess and the mounting lug may be dimensioned to be complementary in shape to each other.

According to an exemplary embodiment of the interdental instrument, the guide lug engaging in the material recess enters a joint recess when the insertion mounting position is reached. This may, for example, be cupped, frustoconical or cone-shaped. Preferably, the guide lug engages in the material recess so that, in particular, the pivoting movement of the carrier relative to the handling section is fixed about the pivot axis, which then preferably passes through the joint recess. Preferably, for disassembling the carrier from the handling section, the latching force resulting due to the latching between the guide lug and the material recess must first be overcome before the carrier can be disassembled along the linear disassembly direction. Preferably, the carrier does not leave the slide-in mounting position during a pivoting movement relative to the handling section. For example, the guide lug engaging the material recess can slide along the material recess during a pivoting movement of the carrier relative to the handling section, wherein preferably the carrier is additionally supported at the handling section during pivoting.

According to an exemplary embodiment, the material recess is ramp-like. In particular, the material recess continuously guides the guide lug in the direction of the joint recess during assembly of the carrier to the handling section. The material recess formed as a drive-in or drive-up ramp can have a surface that is inclined with respect to the linear mounting direction, along which the guide lug is guided. During insertion or drive-up, a resistance force, in particular frictional force, counteracting the movement increases continuously. A maximum resistance force is reached immediately before the joint recess is reached, into which the guide lug engages during further travel, in particular due to its reduced height relative to the end of the ramp.

Two opposing lateral guide walls are formed along the entry or drive-up ramp, which laterally limit the ramp and/or prevent the ramp from being left laterally by the guide lug transverse to the linear assembly direction. Particularly with the V-shaped structure of the material recess or the ramp, the lateral guide walls support the targeted driving onto the ramp and targeted driving into the joint recess.

For example, guide lugs can be arranged on the tines of the fork structure of the carrier. Furthermore, the tines can be braced during assembly. In particular, the tines are elastically braced against each other in such a way that a deformation restoring force is exerted by the tines, in particular the guide lugs, on the handling section, in particular the drive-in or drive-on ramp. According to an exemplary further development, the material recess, in particular the entry or drive-up direction along the ramp, is oriented in the longitudinal extension direction of the handling section. In an exemplary embodiment, the material recess is formed in the disc-shaped joint section of the handling section and/or is oriented in a 12 o'clock or 6 o'clock position.

According to an exemplary further development, a further material recess, which is formed in particular corresponding to the above material recess, is provided on an opposite side of the handling section, in particular of the disc-shaped joint section. For example, the material recesses can be arranged on a lower and upper side of the handling section facing in the pivoting direction. In this embodiment, therefore, a double ramp structure is formed.

According to an exemplary further development of the interdental instrument according to the disclosure, the carrier engages in the respective angularly offset holding position. In each of the angularly offset operating holding positions, the mounting mechanism is configured such that disassembly along the linear mounting direction is blocked. For example, disassembly of the carrier from the handling section may only be possible in certain angular orientations with respect to the pivot axis, preferably only in a predetermined angular orientation of the carrier relative to the handling section. Preferably, the angular orientation corresponds to that which is established when the carrier is mounted on the handling section. In this way, undesired removal of the carrier from the handling section can be additionally avoided, which preferably results in safe and stable handling of the interdental instrument. Preferably, the locking can be realized by means of a radial stop cooperating with the guide lug. The radial stop can exist, for example, between the carrier and the handling section. Preferably, the radial stop is provided on the handling section side on a circumferential surface of the preferably disk-shaped end and is arranged on the carrier side on at least one inner carrier surface facing the circumferential surface of the preferably disk-shaped end.

According to another aspect of the disclosure that is combinable with the previous aspects, an interdental instrument comprises a rod-shaped handling section for gripping, preferably manually gripping, the interdental instrument, wherein the handling section has two free ends. The interdental instrument may preferably comprise two separate carriers. An interdental part, such as a flossette or an abrasive element, for example an abrasive strip, may be arranged on each of the carriers. A joint means may be provided for pivotally holding the one carrier at the one end of the handling section, such that the one carrier is pivotable relative to the one end of the handling section about a pivot axis between at least two mutually angularly offset holding positions. Further, the interdental instrument may comprise a further joint means for pivotally holding the further carrier to the other end of the handling section such that the further carrier is pivotable relative to the other end of the handling section about a pivot axis between at least two mutually angularly offset holding positions. The one and/or the further joint means for pivotally holding the carrier to the handling section may thereby be configured as with respect to the previous aspects of the. The carrier may thereby be pivotally held to the handling section such that the carrier is pivotable relative to the handling section about a pivot axis. Preferably, at least two angularly offset holding positions of the carrier relative to the handling section are formed, between which the carrier can be pivoted relative to the handling section. The angular offset between the at least two holding positions is preferably determined by the pivot axis. In particular, the at least two angularly offset holding positions span an angular sector between them within which the carrier can be pivoted about the pivot axis relative to the handling section.

The carrier can, for example, be made of a metal, preferably a stainless steel, titanium, or a metallic alloy. Further, plastics, composites, ceramic materials or ceramic composites may be used. For example, the handling section may be made of the same material as the carrier. For example, the handling section may be made of metal, such as stainless steel, titanium, or a metallic alloy, as well as plastic, composite, ceramic material, or ceramic composites. Preferably, materials for the carrier and handling section should be selected which comply with the hygiene regulations in the interdental field. Examples of standards are DIN EN ISO 13402, DIN EN ISO 21530, DIN EN ISO 7153, DIN EN ISO 10271. The materials of the components of an interdental instrument must be autoclavable at least 134° C. and must be able to be cleaned and disinfected by commercially available disinfectants. Materials can also be used which are not autoclavable but can be cleaned and disinfected by commercially available disinfectants. When selecting the material, it is preferable to take into account whether the respective component or the respective application is a so-called semi-critical application, in which the interdental treatment is held in such a way that no blood contact occurs with the respective component, or a so-called critical application, in which blood contact can occur on the corresponding component of the interdental instrument during the interdental treatment. Components of the interdental instrument which are designed for critical use must in particular be capable of being autoclaved at least 134° C. and cleaned or disinfected by commercially available disinfectants. In the case of semi-critical use, autoclavability at least 134° C. is not absolutely necessary, so that cleaning or disinfection with commercially available disinfectants is sufficient.

The interdental part can be an abrasive element, such as an abrasive strip or a diamond strip. The interdental part or the abrasive element is permanently or detachably arranged on the carrier. It is also conceivable that the abrasive element is manufactured, for example, with the carrier in a two-component injection molding process. Exemplary materials for the abrasive element are corrosion-resistant metal, for example stainless steel, or also plastics. The diamond coating of the diamond strips can have diamond grits in the range between 5 μm and 200 μm grit diameter. It is possible to provide the diamond coating on one side or both sides of the abrasive element. For example, the carrier and/or the abrasive element may have an indicator and/or a color marking by means of which it is possible to read off or identify on which side or surface of the abrasive element the grit or diamond coating is provided. This ensures rapid identification of the corresponding required treatment side of the abrasive element and prevents misuse of the abrasive element. In the case of some abrasive elements, such an indication device is even necessary, since it is not possible to see with the naked eye on which side the grit or diamond coating is located on the abrasive element. For example, the indication device can be a color and/or structural indication device. A diamond coating-free zone may be formed in a central section of the abrasive element viewed in the longitudinal extension direction. Furthermore, the two opposite abrasive edges forming along the longitudinal extension of the abrasive element are generally formed without a diamond coating. Thus, it is possible to produce the abrasive or diamond strips from an already diamond-coated metal strip by cutting them off transversely to the longitudinal extension of the metal strip, using, for example, laser or mechanical cutting devices. Abrasive coatings on the abrasive elements can also be abrasives, such as aluminum oxide, silicon carbide or ceramic materials. Furthermore, it is conceivable to form the abrasive strip on the surface in such a way that the abrasive effect is achieved via the surface roughness. Furthermore, it is conceivable to design the abrasive or diamond strip diamond coating—or abrasive-free and to provide toothing, such as saw toothing, on at least one abrasive edge. A cycloidal or wavy shape of the abrasive edges can also be provided.

Furthermore, it is conceivable to provide the abrasive or diamond strip on at least one abrasive edge with a toothing, such as a saw toothing. It is also possible that the abrasive element is made of stainless steel, in particular a stainless steel strip, and/or has openings, such as mechanical protrusions, on the surface, wherein in particular the abrasive element has the structure of a grater, rasp or shredder. For quick identification of the respective grits on the corresponding abrasive elements for a user, the abrasive elements can be marked with a color marking, such as color line(s), color dot(s) or other arbitrary shapes, and/or the carrier can have a colored surface that represents a color coding for identifying the different grits. For example, a total width of the abrasive element measured in the longitudinal extension direction is in the range of 15 mm to 35 mm, preferably in the range of 20 mm to 30 mm, in particular the width is about 25 mm. A total height of the abrasive element measured transversely to the direction of longitudinal extension may, for example, be in the range from 2 mm to 8 mm, preferably in the range from 3 mm to 7 mm or in the range from 4 mm to 6 mm.

According to a further aspect of the present disclosure, which is combinable with the preceding aspects, a handling section according to the disclosure for an interdental instrument in particular according to the disclosure comprises a rod section having two free ends. The rod section has a substantially constant cross-section along its longitudinal extent, preferably a substantially round, oval or elliptical cross-section. Towards the free ends, the cross-section increasingly tapers and changes its geometric shape away from the round shape to a thinner, almost plate-like shape. A disc section with two diametrically opposed, in particular parallel, surfaces is arranged at each of the free ends. The rod section thereby preferably merges continuously into the respective disk sections. The surfaces may be intended to be attached to a carrier on which an interdental part, such as a flossette or an abrasive element, for example an abrasive strip, is arranged. The surfaces may preferably be clamping surfaces for attaching, in particular by clamping, one carrier each to the handling section. The disc sections and, in particular, the clamping surfaces may be dimensioned and formed as in relation to the preceding aspects of the disclosure.

The handling section also includes a holding section disposed on the rod section and having two diametrically opposed holding surfaces for manually gripping and actuating the handling section. For example, the holding section is located about halfway between the two free ends, preferably about 40%, 30% or 20% of the distance of the free ends starting from one free end. In top view, the holding section has a substantially oval shape and is arranged centrally, i.e. in particular symmetrically, in top view with respect to the rod section. The holding section is essentially a flat disc, viewed in a frontal or lateral view of the holding section. According to the disclosure, the holding section or its holding surfaces are oriented at an angle with respect to the disc section surfaces. Preferably, the angle is in a range from 10° to 80°, preferably in a range from 20° to 70° or in a range from 30° to 60°. This ensures particularly ergonomic use of the handling section. When the handling section is gripped manually, preferably between the thumb and index finger, the disc section surfaces are oriented as exactly horizontally as possible in a normal, ergonomically comfortable hand position, so that the carriers mounted on the handling section are oriented as vertically as possible to achieve simple and improved use of the interdental instrument.

In a further aspect according to the disclosure, which can be combined with the preceding aspects, an abrasive element, in particular an abrasive strip, is provided for an interdental instrument in particular according to the disclosure. In this regard, the abrasive element comprises two flange sections for clamping in a carrier, in particular according to the disclosure, which is designed to be attached to a handling section, in particular according to the disclosure, for manually gripping the interdental instrument. The flange sections each have a material recess, such as an elongated hole recess, for overmolding with carrier material. For example, the material recess extends transversely to the longitudinal extension direction of the abrasive element and has, for example, a material recess width, measured in the longitudinal extension direction of the abrasive element, of at least 0.5 mm to, for example, 3 mm.

An abrasive section for treating interdental spaces extends between the two flange sections, wherein in particular the abrasive section has a constant dimension in a height direction transverse to the direction in which it extends. Exemplary materials for the abrasive element are corrosion-resistant metal, e.g. stainless steel, or also plastics. Furthermore, a diamond coating or a grit with, for example, grit diameters in the range of 5 µm to 200 µm can be provided. It is possible to provide the diamond coating or grit on one side or both sides of the abrasive element. According to the disclosure, a dimension of the flange sections in the height direction is at least 1 mm larger than that of the abrasive section. Further, according to the disclosure, a distance between the material recess and a flange section edge surrounding the same is at least 1 mm. It has been found that a simpler and more stable attachment of the abrasive member to a carrier can thus be achieved.

In particular, the carrier is formed and/or the carrier and the handling section are shape-matched to each other such that the carrier can be attached to the handling section. The attachment of the carrier to the handling section can be done, for example, according to a preferred embodiment of interdental instruments according to the disclosure described previously or below, for example, by means of the mounting/dismounting mechanism.

According to a further aspect of the present disclosure, which is combinable with the preceding aspects, a carrier for an interdental instrument in particular according to the disclosure comprises a substantially U-shaped mounting section. The mounting section has two opposite and, in particular, identically configured legs and a mounting structure connecting the two legs to one another for attachment to a handling section of the interdental instrument, in particular according to the disclosure, which is configured for manual gripping of the interdental instrument. For example, the mounting section and, in particular, the mounting structure may be configured as with respect to the preceding aspects of the disclosure. For example, the mounting structure may be formed by the two clamping arms described with respect to the first aspect of the disclosure.

The carrier further comprises an actuating section with two flanks for clamping an interdental part, such as a flossette or an abrasive element, in particular according to the disclosure, and two grippers for manually gripping the carrier. For example, the grippers may comprise the gripping sections described with respect to the first aspect of the disclosure. It is possible for the actuating section and the mounting section to have different colors to ensure unambiguous identification, as the colors may characterize the type or grit and/or diamond coating of the respective interdental member. According to the disclosure, the mounting section and the actuating section are manufactured in a two-step injection molding process such that the mounting section legs and the grippers are in contact with each other at an interface, and the mounting section legs and the flanks are free of a contact interface between them.

In an exemplary embodiment of the carrier according to the disclosure, the mounting section legs are at least partially overmolded by the actuating section, in particular the grippers. In a further embodiment, the contact interface between the mounting section leg and the gripper is formed at least partially on a peripheral surface of the mounting section legs. Further, a longitudinal extent of the flanks may be about one-third of the longitudinal extent of the assembly section legs. For example, the longitudinal extent of the flanks is less than one-third of the longitudinal extent of the mounting section legs.

According to a further aspect of the disclosure, there is provided a method of manufacturing a carrier, in particular according to the disclosure, for an interdental instrument, in particular according to the disclosure. In the method, a substantially U-shaped mounting section having two legs and a mounting structure interconnecting the two legs for attachment to a handling section of the interdental instrument, in particular according to the disclosure, which is designed for manual gripping of the interdental instrument, is produced in an injection molding process. Furthermore, according to the disclosure, an actuating section with two flanks for clamping an interdental part, such as a flossette or an abrasive element, in particular according to the disclosure, and two grippers for manually gripping the carrier is injection-molded onto the mounting section legs in a downstream injection molding process. As a result, the contact interface between the mounting section leg and the actuating section described with respect to the preceding aspect of the disclosure is established.

In a further development of the method according to the disclosure, after the injection molding step for producing the mounting section, the actuating section is produced in a downstream injection molding step. Preferably, the actuating section is molded onto the mounting section and the interdental part in such a way that the grippers are molded onto the mounting section legs and the flanks are molded onto the interdental part.

In the following description of exemplary embodiments, the interdental instrument according to the disclosure is generally provided with the reference numeral 1. Corresponding components of the various exemplary embodiments of the interdental instrument 1 according to the disclosure are provided with the same reference numeral.

FIG. 1 shows a frontal view of a carrier 3 of the interdental instrument 1 according to an exemplary embodiment. The carrier 3 can, for example, be made of a metal, preferably a stainless steel, titanium, or a metallic alloy. Further, plastics, composites or ceramic materials may find application. Preferably, the materials are autoclavable at least 134° C. and/or can be cleaned and disinfected by commercially available disinfectants. In frontal view, an outline of the carrier 3 is substantially U-shaped. Two lateral flanks 5, 7 viewed in the width direction B, which lies in the drawing plane, extend substantially parallel to each other in a height direction H perpendicular to the width direction B. The flanks 5, 7 merge into two clamping arms 9, 11 (tines) extending substantially in the width direction B and connecting the two flanks 5, 7 to each other, resulting in a kind of fork structure. The clamping arms 9, 11 extend essentially parallel to one another and are connected to one another in such a way that a clamping space 13 is formed between them. The respective flanks 5, 7 preferably merge continuously into the respective clamping arms 9, 11. For example, a transition region between flank 5, 7 and clamping arm 9, 11 has a curved, in particular circular section shape, wherein in particular a radius of the circular arc section 10 is about 5 mm. On the inside of the two flanks 5, 7, support flanks 19, 21 extend in each case from a flank inner side 15, 17 to the lower clamping arm 11 as viewed in the height direction H. Preferably, the support flanks 19, 21 extend to a lower side 23 of the clamping arm 11. For example, the support flanks 19, 21 extend at an angle of about 30°, although other angles in the range from 10° to 60°, for example 45°, with respect to the height direction H between the respective flank 5, 7 and the clamping arm 11 are also conceivable. As can be seen in FIG. 1, the support flanks 19, 21 have a significantly smaller cross-sectional dimension than the clamping arms 9, 11 and than the flanks 5, 7. According to FIG. 1, the support flanks 19, 21 are arranged on the front side of the flanks 5, 7 only on one side, i.e. only on that side on which the abrasive or diamond side (grit) 54 is located. They thus serve additionally to identify the abrasive or diamond side 54 of the abrasive element 49. A gripping section for manual gripping and/or handling of the carrier 3 is provided in each case on the respective flank outer sides 25, 27 of the flanks 5, 7 opposite the flank inner sides 15, 17. The gripping sections 31, 29 have an inwardly curved geometry to enable ergonomic gripping and/or handling of the carrier, i.e. in particular when the carrier 3 is used for interdental treatment without the handling section 55. By way of example, the radius of curvature is about 16 mm, although other radii are also conceivable and can preferably be in the range from 5 mm to 30 mm. The gripping sections 29, 31 can have a plurality of nubs 33 extending in a depth direction T perpendicular to the width and height direction and/or forming substantially along the full depth of the gripping sections 29, 31, which can additionally facilitate gripping or handling of the carrier 3.

According to the first embodiment of the carrier 3 of the interdental instrument 1 according to the disclosure illustrated in FIGS. 1 to 3, the carrier 3 has a joint device 35 for pivotally holding the carrier 3 on a further component of the interdental instrument 1. The joint device 35 is designed in such a way that the carrier can be displaced relative to the further component of the interdental instrument 1 about a pivot axis S. As indicated in particular in FIG. 1 and FIG. 2, the pivot axis is preferably oriented parallel to the height direction H and corresponds to an axis of symmetry of the carrier 3. The joint device has two opposing guide counter-surfaces 37, 39. According to the illustrated embodiment example, the guide counter-surfaces 37, 39 are arranged on sides of the clamping arms 9, 11 facing each other. The clamping arms merge continuously, preferably curved, into one another on the inside of the clamping space, for example (fork structure). The guide counter-surfaces 37, 39 are substantially planar and oriented parallel to one another. Preferably, the two guide counter-surfaces 37, 39 are formed completely parallel to each other, except for a respective guide lug 41, 43 extending away from the respective clamping arm 9, 11 in the direction of the respective other clamping arm 9, 11. The guide lugs 41, 43 can belong to a mounting/dismounting mechanism of the joint device 35, which permits mounting of the carrier 3 at a single predetermined insertion position on the further component of the interdental instrument 1 along a linear mounting direction M (shown in FIG. 6). As can be seen in particular in FIG. 2, the guide lug 43 arranged on the clamping arm 11 has a hemispherical shape. The same applies to the guide lug 41 arranged on the upper clamping arm 9, viewed in the height direction H. Other geometric shapes, such as an oval shape, a conical shape or a truncated conical shape, are also conceivable.

With reference to FIGS. 2 and 3, the upper clamping arm 9 in the height direction H has a disc 45 arranged preferably centrally with respect to the width extension B of the clamping arm 9. As a result, an enlarged guide counter-surface 39 of the joint device 35 is realized on the bottom side of the disk 45 facing the clamping space 13. Thus, a better guided and more stable pivoting of the carrier 3 with respect to the further component of the interdental instrument 1 results. A diameter of the disk 45 can decrease towards the upper side 47, as it is shown for example in FIG. 3. It is clear that the clamping arm 9 does not necessarily have to comprise the disc 45, but may also have, for example, a constant cross-section along the full extension thereof in the width direction B. The disc 45 also has the additional advantage, which is particularly useful when manually gripping the carrier 3 in an application of the carrier 3 for interdental treatment without the handling section 55, of providing the user with another support surface for a finger to improve the targeted and ergonomic application of the carrier 3. For example, the user can grasp the carrier 3 laterally with the thumb and middle finger respectively on one of the gripping sections 29, 31 and place the index finger on the disc 45 from above in order to hold the carrier 3 more stably in the hand and to be able to carry out a more targeted treatment.

A total width of the carrier 3 measured in the width direction B is, for example, in the range from 10 mm to 50 mm, preferably in the range from 15 mm to 45 mm, in the range from 20 mm to 40 mm, or in the range from 25 mm to 35 mm. A height of the carrier 3 measured in the height direction H may be, for example, in the range from 10 mm to 40 mm, preferably in the range from 15 mm to 35 mm, in the range from 20 mm to 30 mm, or in particular may be about 22 mm to 25 mm. A maximum depth of the carrier 3 measured in the depth direction T, which is preferably defined by the disc section 45 or the gripping section 29, 31, is for example in the range from 5 mm to 15 mm, preferably in the range from 6 mm to 12 mm or in the range from 7 mm to 10 mm. The flanks 5, 7 have, for example, a circular cross-sectional shape, wherein a diameter of the flanks 5, 7 may be about 2 mm in a lower region as viewed in the height direction H, which is arranged above the respective gripping section 29, 31 by way of example, and may be about 2.5 mm to 7 mm in an upper region as viewed in the height direction H, which is arranged below the respective gripping section 29, 31 by way of example.

An interdental part is arranged on the carrier 3 for interdental treatment on a patient. In the embodiments shown, the interdental part is an abrasive element 49, such as an abrasive strip or a diamond strip. The interdental part or the abrasive element 49 is arranged on the lower of the flanks 5, 7, as viewed in the height direction H. For example, the attachment points of the abrasive element 49 are located on the respective flank inner sides 15, 17 of the flanks 5, 7. For example, the abrasive element 49 is detachably attached to the carrier 3, in particular to the flanks 5, 7. It is also conceivable that the abrasive element 49 is produced, for example, with the carrier 3 in a two-component injection molding process. For example, the abrasive element 49 is a diamond strip or an abrasive strip. Exemplary materials are corrosion-resistant metal, for example stainless steel, or also plastics. The diamond coating 50, which can also be designed as a grit, of the diamond strip can have diamond grits in the range between 5 μm and 200 μm grit diameter. It is possible to provide the diamond coating on one side or on both sides of the abrasive element 49. A diamond-free zone can be formed in a central section of the abrasive element 49 viewed in the width direction B. Furthermore, the two opposite abrasive edges 51, 53 forming along the longitudinal extension of the abrasive element 49 are generally formed without a diamond coating. Thus, it is possible to produce the abrasive or diamond strips from an already diamond-coated metal strip by cutting them off transversely to the longitudinal extent of the metal strip, using, for example, laser or mechanical cutting devices. Abrasives, such as aluminum oxide, silicon carbide or ceramic materials, can also be used as abrasive coatings on the abrasive elements 49. Furthermore, it is conceivable to form the abrasive strip on the surface in such a way that the abrasive effect is achieved via the surface roughness. Furthermore, it is conceivable to design the abrasive or diamond strip diamond coating—or abrasive-free and to provide toothing, such as saw toothing, on at least one abrasive edge 51, 53. A cycloidal or wavy shape of the abrasive edges 51, 53 can also be provided. Furthermore, it is conceivable to provide the abrasive or diamond strip on at least one abrasive edge 51, 53 with toothing, such as saw toothing. It is also possible for the abrasive element to be made of stainless steel, in particular a stainless steel strip, and/or to have openings, such as mechanical protrusions, on the surface, wherein in particular the abrasive element has the structure of a grater, rasp or grating. For quick identification of the respective grits on the corresponding abrasive elements 49 for a user, the abrasive elements 49 can be marked with a color marking (color dash(s), color dot(s) or other arbitrary shapes) and/or the carrier 3 can have a colored surface representing a color coding for identifying the different grits. For example, a total width of the abrasive element 49 measured in the width direction B is in the range of 15 mm to 35 mm, preferably in the range of 20 mm to 30 mm, in particular the width is about 25 mm. For example, a total height of the abrasive element 49 measured in height direction H may be in the range of 2 mm to 8 mm, preferably in the range of 3 mm to 7 mm or in the range of 4 mm to 6 mm.

As can be seen in FIG. 2, an indicator 115, 116 is provided on the flanks 5, 7 of the carrier 3 to indicate the diamond coating 50 or grit size to indicate to the user on which side or surface of the abrasive element 59 the diamond coating 50 or grit size is located. In this way, the correct application of the interdental instrument can be ensured and misapplication can be prevented. For example, as shown in FIG. 2, the indication device is provided by, for example, four tines of the same shape, which are formed, for example, as equilateral and/or isosceles triangles, although any other geometric shapes are also conceivable. It is possible that the indication device 115, 116, or the tines, are arranged on both sides, i.e. on both the flank 5 and the flank 7 on the corresponding side or surface of the abrasive element 49. Alternatively, the indication device 115, 116, like the tines, may also be part of the abrasive element 49. Preferably, the indication device 115, 116 is arranged directly adjacent to at least one of the two flanks 5, 7 on the abrasive element 49.

Referring to FIGS. 4 to 6, a first embodiment of a handling section 55 of the interdental instrument 1 according to the disclosure is illustrated, which is intended to be manually gripped by an operator for handling the interdental instrument 1. For example, FIG. 4 is a top view of the handling section 55 and FIG. 5 is a bottom view of the handling section 55. For example, the handling section 55 may be made of the same material as the carrier 3. For example, the handling section 55 may be made of metal, such as stainless steel, titanium or a metallic alloy, as well as plastic, composite, ceramic material or ceramic composites. Preferably, materials are to be selected which comply with the hygiene regulations, in particular DIN EN ISO 13402, DIN EN ISO 21530, DIN EN ISO 7153, DIN EN ISO 10271, in the interdental field. The handling section 55 comprises an elongated rod section 57 which opens into a disc section 61 at a free end 59. The rod section 57 is not limited to a specific geometric shape, but can have any suitable geometric shape and be, for example, straight, curved or at least sectionally curved. In general, it is advantageous to design and/or dimension the handling section 55 such that it can be gripped ergonomically. To further improve ergonomics, at least one predefined gripping section may be provided on the rod section 57, which is also intended to increase gripping stability for the fingers of the operator's hand. An exemplary geometric shape is shown in FIGS. 4 and 5, according to which the rod section 57 is rounded at a free end 63 diametrically opposite the disc section. From this free end 63, the rod section 57 merges into a segment 65 which is widened as measured in the width direction B and which is adjoined by a narrower segment 67 which is dimensioned in the width direction B and which, in turn, is adjoined by a segment 69 which is wider as measured in the width direction B. An end segment 71 adjoining the segment 69, which tapers increasingly towards the disc section 61, has a rectilinearly extending outer contour. In the exemplary embodiment, the further segments 69, 67 and 65 have curved or bent outer contours. Transverse nubs 73 oriented transversely to the longitudinal extension direction of the rod section 55 may be formed on at least one of the segments 65 to 71, which facilitate gripping or handling of the handling section 55.

The disc section 61, which may for example have a disc diameter in the range of 1 mm to 20 mm, has two opposing preferably flat disc surfaces 75, 77. For example, the disc surface 75 shown in FIG. 4 is the upper side of the disc section 61 and the disc surface 77 shown in FIG. 5 is the lower side of the disc section 61. A circumferential edge 79 of the disc section 61 is circular in shape according to the exemplary embodiment. The joint device 35 for pivotally holding the carrier 3 to the handling section 55 further comprises two opposing sliding guide surfaces 76, 78 which are formed by the disk surfaces 75, 77 according to the exemplary embodiment. The linear mounting direction M (FIG. 9) of the carrier 3 with respect to the handling section 55 is realized by a material recess 81 tapering towards a slide-in mounting position, which, as shown in FIG. 4, is arranged for example on the disk surface 75 and/or the disk surface 77 (FIG. 5). The material recess 81 and the guide or mounting lugs 41, 43 are preferably dimensioned such that the guide lugs 41 and/or 43 engage the disk surface 75 and/or 77 when the carrier 3 and the handling section 55 are mounted together. The slide-in mounting position may be defined, for example, by a cupped joint recess 85 formed in a center 83 of the disk section 61 into which the guide lug 41 and/or 43 engages in the slide-in mounting position. For example, the joint recess 85 has a cupped form. When the slide-in mounting position is reached, i.e. when the guide lug 41 and/or 43 engages in the respective joint recess 85 provided on the disk surface 75 and/or 77, there is exclusively a degree of freedom of pivoting movement about the pivot axis S and, furthermore, disassembly of the carrier 3 is permitted exclusively in the opposite direction to the linear mounting direction M from the handling section 55.

The material recess 81 is formed, for example, as a ramp which has a V-shape in top view and continuously guides the guide lug 41, 43 in the direction of the joint recess 85 during assembly of the carrier 3 to the handling section 55. The entry or drive-up ramp 81 has a surface 169 which is inclined with respect to the linear assembly direction M and along which the guide lug 41, 43 is guided. The entry or drive-up ramp 81 also has two opposing lateral guide walls 171, 173 (ramp side walls) extending in the direction of the joint recess 85, which laterally limit the ramp 81 and/or prevent lateral exit of the ramp 81 by the guide lug 41, 43 transverse to the linear assembly direction M. The material recess or ramp 81 is formed in the disc-shaped joint section 61 of the handling section 55, in a 12 o'clock or 6 o'clock position.

In an exemplary alternative embodiment, which is not shown, the guide lugs 41 and/or 43 can be dispensed with. In this case, the disc surfaces 75, 77 and the guide counter-surfaces 37, 39$^i$ are matched in shape to one another. The disc surfaces 75, 77 can have a concave structure or contour at least in some areas and the guide counter-surfaces 37, 39 can have a convex structure or contour at least in some areas, or vice versa. As a result of the surfaces of the carrier 3 and the handling section 55 being matched in shape to one another, the aspect of the degree of freedom of pivoting movement about the pivot axis S according to the disclosure can thus also be produced without guide lugs 41, 43 and without a joint recess 85. Furthermore, it is conceivable that the guide lugs 41, 43 and the joint recess 85 are provided in addition to the convex/concave surface structures, in particular in order to generate an additional fixation of the holder 3 to the handling section 55.

With reference to FIG. 5, the pivoting movement option of the carrier 3 with respect to the handling section 55 is clarified. The carrier 3 can be pivoted about the pivot axis S relative to the handling section 55 between at least two mutually angularly offset holding positions. According to FIG. 5, four mutually angularly offset holding positions are provided as an example. With reference to FIG. 8, a further embodiment of the handling section 55 is shown in which seven mutually angularly offset holding positions are provided. It should be understood that three, five, six, eight or, for example, even nine holding positions can also be provided. In order to make this possible, at least two mutually angularly offset grooves 87 are provided on at least one of the two disc surfaces 75, 77 with respect to the pivot axis S, which grooves each define a holding position. The grooves 87 are formed, for example, along the complete disc diameter of the disc section 61 and are oriented in such a way that the joint recess 85 is located within the grooves 87. For example, the grooves 87 may be hemispherical, tapered, or frustoconical in shape. Thus, the joint recess 85 divides the grooves 87 into two groove sections, preferably of the same shape and dimensions, which are arranged evenly distributed with respect to each other in the circumferential direction about the pivot axis S. The carrier 3 and, in particular, the guide counter-surfaces 37, 39 of the carrier 3 are dimensioned in such a way that they can each engage in the mutually angularly offset holding positions. When the carrier 3 has assumed a holding position on the handling section 55, i.e. has engaged in one of the grooves 87, disassembly of the carrier 3 from the handling section 55 along the linear mounting direction M is blocked.

In the exemplary embodiment according to FIG. 6, the disk section 61 is oriented substantially in the direction of extension of the handling section 55, in particular parallel to the end segment 71. However, it is also conceivable that the disc section 61 is attached to the handling section 55 at an angle with respect to the direction of extension of the end segment 71. For example, angles may be in the range of ±45°, where +45° defines an orientation of the disc section 61 upward in the height direction H and −45° defines an orientation of the disc section 61 downward in the height direction H.

The side view according to FIG. 7 shows another embodiment of the handling section 55 and differs from the side view of the handling section 55 according to the embodiment in FIG. 6 only in that the disk section 61 is oriented 180° rotated at the handling section 55. This means that the disc surface 75, which in FIG. 6 was facing up and formed without grooves 87, is facing down in the embodiment according to FIG. 7.

The pre-assembly state of the carrier 3 with respect to the handling section 55 shown in FIG. 9 illustrates the assembly, in particular the assembly direction M, of the components with respect to each other. When mounting the carrier 3 to the handling section 55, a predetermined orientation of the carrier 3 relative to the handling section 55 must be maintained. In doing so, the carrier 3 is to be oriented, in particular with respect to the handling section, in such a way that the plane in which the disc section 61 lies is both perpendicular with respect to the plane in which the abrasive element 49 lies and also perpendicular to a plane which passes through one of the two flanks 5, 7 of the carrier 3 and is in turn oriented perpendicular with respect to the plane of the abrasive element 49. Thus, it is ensured that the carrier 3 can assume the slide-in mounting position on the handling section 51, in particular that the guide lug 41 and/or 43 can be slid onto the handling section 55 by means of the material recess 81 and can be inserted along the material recess 81 into the joint recess 85 in the disc section center 83.

FIG. 10 shows an assembly state of the carrier 3 on the handling section 55 in a perspective view of the interdental instrument 1. The pivot axis S crosses the sliding guide surfaces 76, 78 and the guide counter-surfaces 37, 39. In the exemplary embodiments shown, the pivot axis is perpendicular to the sliding guide and guide counter-surfaces 37, 39, 76, 78. The mounting of the carrier 3 on the handling section 55 can be done in such a way that there is an expansion clamping or a compression clamping between the guide counter-surfaces 37, 39 and the sliding guide surfaces 76, 78, so that the surfaces are braced against each other, preferably to obtain a stable device. For example, the two sliding guide surfaces 76, 78 and the two guide counter-surfaces 37, 39 are elastically biased against each other in such a way that a pivoting mobility of the carrier 3 relative to the handling section 55 is realized only in a pivoting plane preferably defined by the guide surfaces. Furthermore, it can be seen in FIG. 10 that the handling section 55 has a longitudinal direction of extension which is oriented essentially parallel to the guide surfaces 37, 39 and 76, 78, whereby essentially parallel is to be understood in the sense that there is an angle of less than 20° of the longitudinal extension with respect to the plane guide surfaces 37, 39, 76, 78.

The clamping arms 9, 11 are shaped and dimensioned, for example, in such a way that the disk sections 61 of the handling section 55 can be inserted between the clamping space 13 formed by the clamping arms 9, 11, preferably with elastic deformation of the clamping arms 9, 11.

With reference to FIGS. 12 to 17, a further embodiment of the interdental instrument 1 according to the disclosure is described, wherein with reference to FIGS. 12 to 14, a further exemplary embodiment of the handling section 55 according to the disclosure is illustrated. The embodiment of the handling section 55 according to FIGS. 12 to 14 differs from the previously illustrated embodiments, firstly, in that the disc section 61 is formed on both sides, i.e. on both disc surfaces 75, 77, with grooves 87 and a material recess 81 in each case. For example, an embodiment with four predefined and mutually angularly offset holding positions is shown. Alternatively, more or fewer holding positions may be provided. It should be understood, as is also shown with reference to FIG. 14, that the disc surfaces 75, 77 may be congruently sized and shaped. This means that the respective material recesses 81 and the respective grooves 87 are in alignment or diametrically opposed.

Secondly, the embodiment of the handling section 55 according to FIGS. 12 to 14 differs in the dimensioning or geometric shape of the rod section 57 that connects to the disc section 61. Immediately adjacent to the disc section 61, a substantially rectilinear extension section 117 of constant cross-section extends away from the disc section 61. The extension section 117 opens into a cross-sectionally larger finger gripping section 119 which, according to the embodiment according to FIGS. 12 to 14, has gripping nubs 121 preferably made of an anti-slip material, such as rubber, to ensure safe handling of the handling section 55 while preventing fingers from slipping off the handling section 55. The finger gripping section 119 has a full circumferential concave shape. Adjacent to the finger gripping section 119, as shown in particular in FIG. 13 and FIG. 12, is a rectilinear hand gripping section 123 of constant cross-section when viewed from below and above, respectively. In FIG. 14, it can be seen that the hand gripping section 123 has a curved shape, in particular an upwardly curved shape, in a side view of the handling section 55. This makes the hand griping section 55 ergonomically advantageous to grip or handling.

FIGS. 15 to 17 show the pre-assembly and assembly of the carrier 3 to the handling section 55 according to FIGS. 12 to 14. The mounting or orientation of the carrier 3 with respect to the handling section 55 is based on the same idea according to the disclosure as has already been explained with respect to FIGS. 9 to 11. For example, in the assembled state, the pivot axis S crosses the sliding guide surfaces 76, 78 and is preferably perpendicular thereto. Furthermore, the joint device 35 has an—assembly/disassembly mechanism which allows the carrier 3 to be assembled at a single predetermined insertion position, namely the material recess 81, along a linear assembly direction M. When the slide-in mounting position is reached, i.e. at the position shown in FIG. 16, only one degree of freedom of pivoting movement about the pivot axis S and disassembly of the carrier 3 in the opposite direction to the linear mounting direction M from the handling section 55 is permitted.

With reference to FIGS. 18 and 19, a further exemplary embodiment of the interdental instrument 1 according to the disclosure is described, whereby in the following embodiment only the structural features deviating from the previous embodiments of FIGS. 1 to 17 are discussed. In FIG. 18, the carrier 3 is formed according to a second embodiment example and in FIG. 19, the handling section 55 is formed according to a third embodiment example. According to the further embodiment example of the interdental instrument 1, the joint device 35 additionally comprises a respective latch for each holding position of the carrier 3 on the handling section 55. The latching is formed, for example, by one or more latching lugs and one or more latching recesses preferably formed in a shape complementary to the latching lugs, wherein the at least one latching lug and/or at least one latching recess is arranged in the respective sliding guide surface 76, 78 and/or the guide counter-surface 37, 39. For example, the latching lugs 89 are attached to the carrier 3, with two latching lugs 89 in each case projecting in the direction of the clamping space 13 from the mutually facing guide counter-surfaces 37, 39 formed on the clamping arms 9, 11. For example, the respective latching lugs 89 are arranged at the same height with respect to the width extension of the carrier 3 and preferably have the same geometric shape and/or dimension. Furthermore, the latching lugs 89 each have the same distance to the guide or mounting lugs 41, 43 lying in the pivot axis.

As can be seen in FIG. 19, the latching recesses 91 are formed on at least one of the disc section surfaces 75, 76/77, 78. It is clear that the latching recesses 91 may be provided in addition to the grooves 87 described with respect to the first embodiment in FIGS. 4 and 5. According to the exemplary embodiment shown in FIG. 19, the latching recesses 91 are arranged uniformly in the circumferential direction around the disk section center 83 or the joint recess 85, with each two latching recesses 91 lying on a diameter line passing through the joint recess 85. The latching recesses 91 are located approximately halfway along the disc radius of the disc section 61. In the embodiment according to FIG. 8 with four holding positions offset at an angle to one another, two adjacent latching recesses 91 are arranged at a distance from one another or distributed in the circumferential direction in such a way that an angular sector spanned with respect to the disc section center 83 and defined by the two latching recesses 91 forms an angle of 45°. It is clear that the angular sector varies according to the number of holding positions provided. By way of example, the embodiment according to FIG. 20 shows a disc section 61 with seven mutually angularly offset holding positions, i.e. with 14 mutually angularly offset latching recesses 91, although it is clear that more or fewer such latching recesses can also be provided. The latching recesses 91 according to FIG. 20 are dimensioned and arranged at a distance from one another in such a way that they partially overlap one another. As a result, there is no material strut of the disk surface 75, 77/76, 78 between two adjacent latching recesses 91, except between the respective latching recesses 91 arranged closest to the material recess 81 or to the handling section 55, as is the case, for example, in the embodiment according to FIG. 19.

FIGS. 21 and 22 show a further embodiment of the interdental instrument 1 according to the disclosure, wherein FIG. 21 shows the carrier 3 according to the third embodiment example and FIG. 22 shows the handling section 55 of a fifth embodiment example. The carrier 3 according to the third embodiment example differs from the carrier 3 of the first embodiment example in that an additional latch is provided for latching the carrier 3 to the handling section 55, similar to the second embodiment example according to FIGS. 18 and 19. According to FIG. 21, the carrier 3 has two latching struts 93, 95 arranged in the clamping space 13, connecting the two clamping arms 9, 11 to one another and extending substantially parallel to one another and parallel to the flanks 3, 5. The latching struts 93, 95 are arranged mirror-inverted to one another, so that in each case one latching surface 94, 96 faces the respective other latching surface 96, 94. The latching struts 93, 95 can, for example, have a triangular cross-sectional shape, with, for example, the legs of the preferably isosceles triangle enclosing an angle of about 75°, although other angles, for example in the range from 60° to 90°, are also conceivable. According to an exemplary embodiment, the two latching struts 93, 95 are arranged at a distance of 5 mm to 20 mm from one another, the distance being about 12 mm, for example. As can be seen in FIG. 21, the latching struts 93, 95 divide the clamping space 13 into three clamping space segments, with mirror-inverted clamping space segments 97, 99 of essentially the same size lying on the outside of the latching struts 93, 95, resulting in a central clamping space 101 formed between the latching struts.

According to the further embodiment example of the interdental instrument 1 according to the disclosure, the handling section 55 has latching notches 103 on the disc section 61, or on its circumferential edge 79, preferably extending along the entire height of the disc, into which the latching struts 93, 95 can latch for assuming the insertion mounting position. The latching notches 103 are, for example, evenly distributed in the circumferential direction along the circumferential edge 79. In particular, two latching notches are arranged on each circumferential edge 79 such that the two latching notches 103 lie on a diametral line extending through the joint recess 85 and the disk section center 83, respectively. For example, an angular sector between two mutually adjacent latching notches 103 starting from the disc section center 83 is about 45°, for example also about 30°, about 40° or about 50°. In the embodiment according to FIG. 22, the disk section 61 has, for example, eight latching notches 103, which thus define four mutually angularly offset holding positions of the carrier 3 on the handling section 55. According to another alternative of the handling section 55, shown in FIG. 23, the disc section 61 has fourteen latching notches 103, which thus define seven mutually angularly offset holding positions of the carrier 3 with respect to the handling section 55. It is clear that a circumferential edge section 125 extending in the circumferential direction is formed between each two latching notches 103. It is further understood that the size of the circumferential edge section 125, or the extent thereof in the circumferential direction, depends on the number of the latching notches 103. In particular, the circumferential edge sections 125 according to FIG. 22 are formed larger than the circumferential edge sections 125 according to FIG. 23. It is possible that the latching notches 103 have a V-shaped cross-section, with, for example, the two latching notch legs forming an angle of about 75°, although other angles are also conceivable, for example in the range of 60° to 90°. Furthermore, the cross-section of the latching notches 103 may be hemispherical or oval in shape. It should be understood that the latching elements 95, 93 and 103 or 89 and 91 or 41, 43 and 85 and/or 87 can be combined with each other as required, in particular to adjust the pivoting mobility or the latching between the carrier 3 and the handling section 55 as required.

FIGS. 24 to 35 show further exemplary embodiments of an interdental instrument 1 according to the disclosure with a rod-shaped handling section 55 for gripping the interdental instrument 1, at the two free ends 105, 107 of which a separate carrier 3 is to be arranged in each case. The respective joint devices 35, which serve to pivotally hold the two carriers 3 on the disc sections 109, 111 of the handling section 55 formed at the free ends 105, 107, can be designed and/or dimensioned, for example, as has been explained with reference to the previous embodiments. In particular, the two joint devices 35 may comprise the latching elements 95, 93 and 103 and/or 89 and 91 and/or 41, 43 and 85 and/or 87 in any number in order, in particular, to adjust the pivoting mobility or the latching between the two carriers 3 and the handling section 55 as required. In the following, exemplary embodiments of the handling section 55 according to the disclosure will be described in more detail, the description being substantially limited to the differences between the respective embodiments.

Referring to FIG. 24, the handling section 55 extends substantially continuously in the width direction B between the two disk sections 109, 111 and has a substantially constant cross-sectional shape.

Approximately centrally, the handling section 55 has a gripping portion 113 which is oval-shaped when viewed from above, facilitates handling and gripping of the handling section 55, and is formed by approximately 10% to 30% of the total longitudinal extent of the handling section 55 when measured in the width direction B, and is dimensioned to be approximately twice to four times as wide as the width of the rod-shaped handling section 55 when measured in the depth direction B. However, the gripping portion 113 can also be arranged off-center on the handling section 55 and divide the handling section 55 into two subsections 127, 129 of the handling section 55, measured in the depth direction T, of different lengths. For example, a user can more easily treat interdental spaces located further back in the mouth with the longer of the subsections 129, 127, while the shorter of the two subsections 127, 129 is more suitable for interdental spaces located further forward in the mouth. At the free ends 105, 107 of the subsections 127, 129 of the handling section 55, disc sections 109, 111 are arranged, respectively, which are identically formed according to FIG. 24. Furthermore, the disc surfaces 75, 77 or their sliding guide surfaces 76, 78 are also identically formed. All disk surfaces 75, 77 have the material recess 81 along which the respective carrier 3 to be attached can be pushed into the disk section center 83, or the joint recess 85. In order to provide the mutually angularly offset retaining positions for the carrier 3 on the handling section 55, the disc sections 109, 107 have, on the disc surfaces 75, 77, the latching recesses 91 which, as has already been explained with reference to previous examples, are arranged on the surfaces 75, 77. All of the features described with respect to the previous examples of embodiment can be applied to the example of embodiment illustrated in FIG. 24, with carriers 3 to be arranged on both sides of the handling section 55, without departing from the basic idea of the disclosure. It can be seen from FIGS. 24 and 25 that the gripping portion 113 is arranged at an angle to the disc surfaces 75, 77 and to the sliding guide surfaces 76, 78, respectively. For example, the angle is in the range of 10° to 80° or preferably in the range of 20° to 70°. Such an inclination of the gripping area with respect to the disc surfaces and the sliding guide surfaces 75 to 78 has the advantage of a particularly ergonomic handling of the interdental instrument 1 according to the disclosure. This is because when the user grips the handling section 55 preferably between the thumb and the index finger, a natural hand posture ensures that the disc surfaces and sliding guide surfaces 75 to 78 are oriented substantially horizontally, so that the user can concentrate on them during interdental treatment without directing a great deal of effort towards ensuring that the carrier 3 and in particular the interdental part 49 arranged on the carrier 3 is oriented straight, i.e. substantially horizontally. The gripping area 113 has two diametrically opposed gripping surfaces 131, 133, which are surrounded by a rounded edge 135, in particular completely. Preferably, it is the gripping surfaces 131, 133 which are arranged at an angle with respect to the disc surfaces 75, 77 or sliding guide surfaces 76, 78. For example, the gripping surfaces 131, 133 are trough-shaped in order to be defined and to differ both haptically and visually from the edge 135.

According to another exemplary embodiment, instead of the gripper surfaces 131, 133, a through-hole (not shown) is provided, for example with a diameter in the range of 15 mm to 20 mm. This results in a particularly simplified and advantageous interdental treatment option. When the interdental instrument 1 is used, it is placed on a tooth of the patient's tooth row in such a way that the operator can, for example, reach through the through-hole by means of his index finger, middle finger or thumb and place the finger on the corresponding tooth so that the corresponding finger serves as a kind of guide pivot around which the interdental part 1 can be rotated to treat the interdental spaces.

The embodiment according to FIG. 26 differs from the embodiment according to FIG. 24 only in the number of latching recesses 91 formed on the disk surfaces 75, 77 or sliding guide surfaces 76, 78. Whereas in FIG. 24 eight latching recesses 91 are provided on each disk surface 75, 77, the embodiment according to FIG. 26 has 14 such latching recesses 91 in order to establish seven mutually angularly offset holding positions for finer angular adjustment of the carrier 3 with respect to the handling section 55 instead of four mutually angularly offset holding positions as in FIG. 24.

With reference to FIGS. 27 and 28, a further embodiment of the handling section 55 according to the disclosure is illustrated, which differs from the embodiments according to FIGS. 24 to 26 only in that instead of the latching recesses 91, grooves 87 are formed on the disc surfaces 75, 77 and the sliding guide surfaces 76, 78, respectively, which provide the mutually angularly offset holding positions and which are dimensioned and oriented essentially as already described with reference to the previous embodiments. In particular, it can be seen from FIG. 29 that both the disc surfaces 75, 77 associated with a disc section 109 or 111 and the disc surfaces 75, 77 of the two diametrically opposed disc sections 109, 111 are identically formed.

The embodiment according to FIGS. 29 to 31 is again an embodiment in which grooves 87 are provided on the disk surfaces 75, 77 to provide the mutually angularly offset holding positions for the carrier 3 on the handling section 55. In one aspect, the embodiment differs from that of FIGS. 27 and 28 in that the grooves 87 are formed on only one of the disk surfaces 75, 77 of a disk section 109, 111, respectively. For example, the disc surfaces 75, 77 of the mutually distally arranged disc sections 111, 109, which comprise the grooves 87, point in the same direction. For example, the disc top surface 75 of each of the two disc sections 109, 111 is formed with grooves 87 and the respective disc bottom surfaces 77 of the two disc sections 111, 109 are formed without grooves 87. Furthermore, the embodiment differs from that of FIGS. 27 and 28 in that 14 mutually angularly offset grooves 87 are provided, whereas in FIGS. 27 and 28 only eight mutually angularly offset grooves are provided. Accordingly, the embodiment according to FIGS. 29 to 31 allows finer angular adjustment of the carrier 3 at the handling section 55.

With reference to FIGS. 32 to 35, two further embodiments of the handling section 55 according to the disclosure are illustrated, one embodiment (FIGS. 32, 33) differing from the other embodiment (FIGS. 34, 35) only in the number of latching notches 103 arranged on the circumferential edge 79 of the respective disc section 109, 111 in order to realize the mutually angularly offset holding positions of the carrier 3 on the handling section 55. In this regard, the latching notches 103 may be dimensioned and oriented as already shown with respect to the preceding embodiments. In FIGS. 32 and 33, respectively, eight mutually angularly offset latching notches 103 are provided to provide four mutually angularly offset holding positions. In the embodiment according to FIGS. 34 and 35, 14 mutually angularly offset latching notches 103 are provided for providing seven mutually angularly offset holding positions.

With reference to FIGS. 36 to 38, a carrier 3 according to the disclosure or, in particular, its manufacture will be explained in more detail. In order to avoid repetition, only the features not yet listed will be referred to with respect to this description, it being clear that the carrier 3 according to FIGS. 36 to 38 may also be formed according to the features detailed with respect to the preceding embodiments. The carrier 3 essentially comprises two main components, namely a substantially U-shaped mounting section 137 (FIG. 36), which is manufactured in a first manufacturing step, and an actuating section (FIG. 38), which is manufactured in a downstream manufacturing step and mounted to the mounting section 137.

In particular, the mounting section 137 has a substantially U-shaped configuration in top view, wherein at the sides two legs 141, which are in particular identically formed, extend substantially parallel to each other from a mounting structure 143 connecting the two legs 141 to each other. The legs 141 may form the flanks 5, 7 described with respect to the preceding embodiments. In particular, the mounting structure 143 is provided for attaching the carrier 3 to a handling section 55 of an interdental part 1, in particular according to the disclosure. In this context, the mounting structure 143 may comprise, for example, the clamping arms 9, 11 as well as the joint device 35. The mounting section 137 is produced, for example, by an injection molding process. In FIG. 36 it can be seen that the entire mounting section 137 is produced in one manufacturing step, namely an injection molding step, in particular with the clamping arms 9, 7 of the joint device 35, the washer 45 as well as the guide lugs 41, 43. The carrier 3 can have, for example, stiffening segments 145 on both sides at the legs 141 extending obliquely from the legs 141 in the direction of the mounting structure 143, in particular in the direction of the lower clamping arm 11. The stiffening segments 145 can be present in addition to or as an alternative to the support flanks 19, 21 (e.g. FIG. 1) and in particular merge continuously into them.

With reference to FIGS. 37 and 38, the downstream step of molding the actuating section 139 to the mounting section 137 is illustrated. First, the interdental part 49 is positioned below the legs 141, in particular without contact. In the present case, the interdental part is designed as an abrasive element and comprises two flange sections 147, 149 at the distal ends of the abrasive element 49, which are designed for clamping in the carrier 3. A material recess 151, 153 is provided in each of the flange sections 147, 149 in order to allow injection molding around with carrier material, in particular actuating section material, in the downstream injection molding step. In FIG. 37, it can be seen that one material recess, which is formed as an elongated hole recess 151, is larger in the direction of extension than the other material recess, which is also formed as an elongated hole recess 153. An abrasive section 155 extending between the flange sections for treating the interdental spaces of the patient has a constant dimension, in particular height, viewed transversely to the direction of extension, and, as shown, merges continuously into the flange sections 147, 149. It can further be seen that a flange section edge 157, 159 surrounding the material recesses 151, 153 is approximately 1 mm. The flange sections 147, 149 also have a larger dimension than the abrasive section 155 when viewed in the height direction.

The interdental part 49 is thereby arranged with respect to the mounting section 137 of the carrier 3 such that the flange sections 147, 149 are positioned directly below, but in particular without contact, with respect to the legs 141. Finally, the actuating section 139 is molded onto the mounting section 137 and the interdental part 49. In particular, the legs 141 of the mounting section 137 and the flange sections 147, 149 of the interdental part 49 are overmolded by the actuating section 139. It can be seen that the actuating section 139 comprises two flanks 161, 163 for clamping the interdental part 49 and two grippers 165, 167, which can be formed, for example, like the gripping sections 29, 31. In this case, the grippers 165, 167 are arranged approximately at the height of the legs 141 and partially surround them, i.e. are at least partially injection-molded onto the assembly section 137 around the legs 141. The two-step injection molding process creates an interface (not shown) between the assembly section legs 141 and the grippers 165, 167 at which the legs 141 and the grippers 165, 167 are in contact with each other. Further, the legs 141 are dimensioned and the actuating section 139 is molded to the interdental member and the mounting section 137, respectively, such that the mounting section legs 141 and the flanks 161, 163 are free of a contact interface.

FIGS. 39 and 40 show a further exemplary embodiment of an interdental instrument 1 according to the disclosure, wherein the carrier 3 is mounted on the handling section 55. For the basic design of the carrier 3 or the handling section 55, reference can be made to the previous explanations. FIG. 40 shows a sectional view according to the line XL-XL of FIG. 39, whereby the sectional line intersects the carrier 3 as well as the disk section 61 of the handling section 55 substantially in the center, so that the function and the design of the joint device 35 are clarified. The joint device 35 has two pairs of sliding guide surfaces 37, 78 and 39, 76, respectively, which are offset from one another in the direction of the pivot axis S and are arranged essentially parallel to one another. Each pair of surfaces 37, 78 and 39, 76, respectively, is formed by a respective sliding guide surface 76, 78 of the handling section and a sliding guide surface 37, 39, in particular a guide counter-surface, of the carrier 3. In this way, a divided pivot axis S is formed, in which two pivot points 175, 177, which are spaced apart from one another in the direction of the pivot axis S, are realized. The pivot points 175, 177 are formed by the carrier-side projections or guide lugs 41, 43. In other words, the pivot axis S extends through the upper tine 9, the disk section 61 and the lower tine 11. Furthermore, it can be seen that the joint recess 85 is realized as a through-hole 179 which extends through the disk section 61 substantially coaxially with the pivot axis S. The two guide lugs 41, 43 project into the through-hole 179 in some areas, wherein a radius of the hemispherical guide lugs 41, 43 is adapted to an inner radius of the through-hole 179.

As can further be seen in FIG. 40, the guide counter-surfaces 37, 39 of the carrier 3 are formed by the clamping space-side surfaces of the tines 9, 11 and the sliding guide surfaces 76, 78 are each formed by a clamping space-side disk surface 75, 77 of the disk section 61, which is inserted into the clamping space 13 of the carrier 3, of the handling section 55. Thus, the joint device 35 comprises a pair of double sliding guide surfaces 37, 78 and 39, 76, respectively, i.e. a total of four guide surfaces along which the carrier 3 can be pivoted in a guided manner relative to the handling section 55 and the disc section 61, respectively. It can be seen that the respective facing surfaces of the pairs of sliding guide surfaces 37, 78 and 39, 76 are in contact with each other, i.e. rest on each other in pairs, substantially over their entire surface area relative to the sliding guide surfaces 76, 78 of the disc section 61.

The features disclosed in the foregoing description, figures, and claims may be of importance, both individually and in any combination, for the realization of the disclosure in the various embodiments.

To enable those skilled in the art to better understand the solution of the present disclosure, the technical solution in the embodiments of the present disclosure is described clearly and completely below in conjunction with the drawings in the embodiments of the present disclosure. Obviously, the embodiments described are only some, not all, of the embodiments of the present disclosure. All other embodiments obtained by those skilled in the art on the basis of the embodiments in the present disclosure without any creative effort should fall within the scope of protection of the present disclosure.

It should be noted that the terms "first", "second", etc. in the description, claims and abovementioned drawings of the present disclosure are used to distinguish between similar objects, but not necessarily used to describe a specific order or sequence. It should be understood that data used in this way can be interchanged as appropriate so that the embodiments of the present disclosure described here can be implemented in an order other than those shown or described here. In addition, the terms "comprise" and "have" and any variants thereof are intended to cover non-exclusive inclusion. For example, a process, method, system, product or equipment comprising a series of steps or modules or units is not necessarily limited to those steps or modules or units which are clearly listed, but may comprise other steps or modules or units which are not clearly listed or are intrinsic to such processes, methods, products or equipment.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

REFERENCE LIST 1 interdental instrument
3 carrier
5, 7 flank
9, 11 clamping arm
10 arc
13 clamping space
15, 17 flank inner side
19, 21 support flank
23 clamping arm bottom side
25, 27 flank outer side
29, 31 gripping section
33 nub
35 joint device (joint)
37, 39 guide counter-surfaces
41, 43 guide lug
45 disc
47 disc section top side
49 abrasive element
50 diamond coating
51, 53 abrasive edge
54 abrasive/diamond side
55 handling section (handle)
57 rod section
59, 63 free end
61 disc section
65, 67, 69, 71 segment
73 cross nub
75, 77 disc surface
76, 78 sliding guide surfaces
79 circumferential edge
81 material recess
83 disc section center
85 joint recess
87 groove
89 latching lug
91 latching recess
93, 95 latching strut
94, 96 latching area
97, 99 clamping space segment
101 central clamping space
103 latching notch
105, 107 free end
109, 111 disc section
113 gripping region
115, 116 indication device
117 extension section
119 finger gripping section
121 gripping nub
123 hand gripping section
125 circumferential edge section
127, 129 subsection
131, 133 gripping surface
135 edge
137 mounting section
139 actuating section
141 leg
143 assembly structure
145 stiffening segment
147, 149 flange section
151, 153 material recess
155 abrasive section
157, 159 flange section edge
161, 163 flank
165, 167 gripper
169 ramp surface
171, 173 ramp side wall
175, 177 pivot point
179 through-hole
H height direction
B width direction
T depth direction
S pivot axis
M mounting direction

The invention claimed is:

1. An interdental instrument comprising:
a handle for manually gripping the interdental instrument;
a carrier held by the handle, on which an interdental part is arranged, the interdental part being a flossette or an abrasive element, wherein the carrier comprises two clamping arms which extend in parallel and are connected to one another such that a clamping space is formed between the two clamping arms; and a joint configured to pivotally hold the carrier on the handle, so that the carrier is pivotable relative to the handle about a pivot axis between at least two holding positions which are offset at an angle to one another, the joint having two mutually opposite sliding guide surfaces which are each formed on a carrier side and on a handle side, wherein the pivot axis crosses the sliding guide surfaces, wherein:

at least one free end of the handle includes a disc shape having opposing flat surfaces that form the two sliding guide surfaces, a circumferential edge of the at least one disc-shaped free end of the handle being circular and/or being provided with latching lugs and/or latching recesses; and the clamping space is shaped such that the at least one disc-shaped free end of the handle is configured to be pushed in with elastic deformation of the two clamping arms, side regions of the two clamping arms facing the two sliding guide surfaces of the at least one disc-shaped free end of the handle being provided with latching elements which cooperate with latching counter-elements on guide counter-surfaces.

2. The interdental instrument according to claim 1, wherein:

the pivot axis is perpendicular to the sliding guide surfaces; and/or the sliding guide surfaces are planar, extend parallel to one another, and/or are clamped with two opposing guide counter-surfaces of the carrier or of the handle under an expansion clamping or a compression clamping.

3. The interdental instrument according to claim 1, wherein:

the two opposing sliding guide surfaces are arranged at one end of the handle formed as a rod, and/or the two sliding guide surfaces are formed on the handle, along which a guide of the carrier is configured to slide during pivoting, and the guide has two opposing guide surfaces which are in sliding engagement with the respective sliding guide surface, or the two sliding guide surfaces are formed on the carrier which are in sliding engagement with two guide surfaces formed on the handle during pivoting.

4. The interdental instrument according to claim 3, wherein the two sliding guide surfaces and the two guide counter-surfaces, each of which is clamped to one of the sliding guide surfaces, are crossed by the pivot axis, wherein the pivot axis is perpendicular to the two sliding guide surfaces and the two guide counter-surfaces.

5. The interdental instrument according to claim 1, wherein the two sliding guide surfaces and the two guide counter-surfaces are elastically pretensioned against each other such that a pivoting mobility of the carrier relative to the handle is realized only in one pivoting plane.

6. The interdental instrument according to claim 1, wherein the handle has a longitudinal extension direction which is oriented parallel to the two guide counter-surfaces of the respective two sliding guide surfaces.

7. The interdental instrument claim 1, wherein:

the joint further comprises a latch for each holding position of the carrier, when the carrier is pivoted into a holding position, a latch resistance is overcome, which holds the carrier stationary in the holding position, a latch is formed by one or more latching lugs and one or more latching recesses, the one or more latching lugs and the one or more latching recesses being matched to a pivoting movement, and the one or more latching lugs and/or the at least one latching recess are formed in the respective sliding guide surface and the guide counter-surface.

8. The interdental instrument according to claim 1, wherein the abrasive element comprises:

two flange sections configured to clamp in the carrier that is configured to be attached to the handle for manually gripping the interdental instrument, the flange sections each having a material recess for overmolding with carrier material; and an abrasive section configured to be extended in an extension direction between the two flange sections for treating interdental spaces, the abrasive section having a constant dimension in a height direction transverse to the extension direction;

wherein a dimension of the flange sections in the height direction is at least 1 mm larger than that of the abrasive section, and a distance between the material recess and a flange section edge surrounding it is at least 1 mm.

9. The interdental instrument according to claim 1, wherein the carrier comprises:

a U-shaped mounting section having two legs and a mounting structure interconnecting the two legs, the U-shaped mounting section being configured for attachment to the handle of the interdental instrument for manually gripping the interdental instrument; and an actuating section with two flanks, configured to clamp an interdental part and two grippers for manually gripping the carrier, wherein the interdental part includes the flossette or the abrasive element;

wherein the U-shaped mounting section and the actuating section are formed such that the two legs and the grippers are in contact with each other at an interface, and the two legs and the two flanks are free of a contact interface.

10. The interdental instrument according to claim 9, wherein the two legs are at least partially overmolded by the grippers of the actuating section, and wherein: the contact interface between the two legs and the grippers is at least partially formed on a circumferential surface of the two legs, and/or a longitudinal extension of the two flanks is about one third of the longitudinal extension of the two legs.

11. A method of manufacturing the interdental instrument of claim 1, the method comprising:

performing an injection molding process to form a substantially U-shaped mounting section having two legs and a mounting structure interconnecting the two legs for attachment to the handle of the interdental instrument for manual gripping of the interdental instrument; and performing a downstream injection molding process to mold, onto the two legs of the mounting section, an actuating section having two flanks configured to clamp the interdental part, and two grippers for manually gripping the carrier, wherein the interdental part includes the flossette or the abrasive element.

12. The method of claim 11, wherein the actuating section is manufactured in the downstream injection molding process and/or the actuating section is molded to the mounting section and the interdental part such that the grippers are molded to the two legs of the mounting section and the two flanks are molded to the interdental part.

13. An interdental instrument, comprising:
a handle for manually gripping the interdental instrument;
a carrier held by the handle, on which an interdental member is disposed, the interdental member being a flossette or an abrasive strip, wherein the carrier comprises two clamping arms which extend in parallel and are connected to one another such that a clamping space is formed between the two clamping arms; and
a joint configured to pivotally hold the carrier on the handle such that the carrier is pivotable relative to the handle about a pivot axis between at least two holding positions which are offset at an angle to one another, the joint having two mutually opposite sliding guide surfaces which are each formed on a carrier side and on a handle side, wherein:
the joint includes a mounting/dismounting mechanism configured to permit mounting of the carrier at a single predetermined insertion position along a linear mounting direction, and wherein upon reaching the insertion mounting position, only one degree of freedom of pivotal movement about the pivot axis and dismounting of the carrier in an opposite direction to the linear mounting direction is permitted;
at least one free end of the handle includes a disc shape having opposing flat surfaces that form the two sliding guide surfaces, a circumferential edge of the at least one disc-shaped free end of the handle being circular and/or being provided with latching lugs and/or latching recesses; and
the clamping space is shaped such that the at least one disc-shaped free end of the handle is configured to be pushed in with elastic deformation of the two clamping arms, side regions of the two clamping arms facing the sliding guide surfaces of the at least one disc-shaped free end of the handle being provided with latching elements which cooperate with latching counter-elements on guide counter-surfaces.

14. The interdental instrument according to claim 13, wherein the linear mounting direction of the carrier with respect to the handle is realized by a material recess tapering towards the insertion position on the at least one disc-shaped free end of the handle, wherein a guide lug is configured to engage with the material recess during insertion into the insertion position.

15. The interdental instrument according to claim 14, wherein in engaging the material recess, upon reaching the insertion position, the guide lug is configured to engage therein a cupped joint recess such that the pivoting movement of the carrier is fixed relative to the handle about the pivot axis.

16. The interdental instrument according to claim 13, wherein the carrier is configured to engage in a respective angularly offset holding positions, wherein in each of the angularly offset operating holding positions, the mounting mechanism is configured such that disassembly along the linear mounting direction is blocked by a radial stop cooperating with the guide lug.

17. An interdental instrument, comprising:
a rod-shaped handle for gripping the interdental instrument, the handle having two free ends;
two separate carriers, on each of which an interdental part is arranged, the interdental part including a flossette or an abrasive strip, wherein each of the carriers comprises two clamping arms which extend in parallel and are connected to one another such that a clamping space is formed between the two clamping arms;
a first joint configured to pivotally hold one of the two separate carriers to one of the two free ends of the handle such that the one of the two carriers is pivotable relative to the one of the two free ends of the handle about a pivot axis between at least two angularly offset holding positions; and
a second joint configured to pivotally hold a second of the two separate carriers at the other of the two free ends of the handle such that the second of the two separate carriers are pivotable relative to the other of the two free ends of the handle about a pivot axis between at least two mutually angularly offset holding positions, wherein:
each of the two free ends of the handle includes a disc shape having opposing flat surfaces that form the two sliding guide surfaces, a circumferential edge of the respective disc-shaped free end of the handle being circular and/or being provided with latching lugs and/or latching recesses; and
the respective clamping spaces are shaped such that the respective disc-shaped free end of the handle is configured to be pushed in with elastic deformation of the two clamping arms, side regions of the two clamping arms facing the sliding guide surfaces of the disc-shaped free end of the handle being provided with latching elements which cooperate with latching counter-elements on guide counter-surfaces.

18. A handle for an interdental instrument, comprising:
a rod section having two free ends;
two disc sections, each arranged at a respective one of the two free ends and each having two diametrically opposite clamping surfaces, configured for clamping attachment of a respective carrier to the handle, the carrier on which an interdental part is arranged, the interdental part including a flossette or an abrasive strip, wherein:
each of the respective carriers comprises two clamping arms which extend in parallel and are connected to one another such that a clamping space is formed between the two clamping arms, and
the respective clamping spaces are shaped such that the respective disc-shaped free end of the handle is configured to be pushed in with elastic deformation of the two clamping arms, side regions of the two clamping arms facing the sliding guide surfaces of the disc-shaped free end of the handle being provided with latching elements which cooperate with latching counter-elements on guide counter-surfaces; and
a holding section arranged on the rod section and having two diametrically opposed holding surfaces for manually gripping and actuating the handle, the holding surfaces being oriented at an angle of 30° to 60° with respect to the clamping surfaces.

* * * * *